US012625479B1

(12) United States Patent　　　　(10) Patent No.:　US 12,625,479 B1

Eberhardt et al.　　　　　　　　　　(45) Date of Patent:　　May 12, 2026

(54) PROACTIVE PRESENTMENT OF PERSONALIZED ACTIVITY RECOMMENDATIONS

(71) Applicant: Amazon Technologies, Inc., Seattle, WA (US)

(72) Inventors: Sven Eberhardt, Seattle, WA (US); Maisie Wang, Seattle, WA (US); Kunal Pramod Ghogale, Redmond, WA (US); Emmett Barton, Seattle, WA (US); Dustin D Clark, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 17/709,759

(22) Filed: Mar. 31, 2022

(51) Int. Cl.
| | |
|---|---|
| *G06F 3/048* | (2013.01) |
| *G05B 19/042* | (2006.01) |
| *G06F 3/14* | (2006.01) |
| *G06N 20/00* | (2019.01) |
| *G06V 40/16* | (2022.01) |
| *G10L 17/02* | (2013.01) |
| *G10L 17/06* | (2013.01) |

(52) U.S. Cl.
CPC ............. *G05B 19/042* (2013.01); *G06F 3/14* (2013.01); *G06N 20/00* (2019.01); *G06V 40/161* (2022.01); *G06V 40/168* (2022.01); *G06V 40/172* (2022.01); *G10L 17/02* (2013.01); *G10L 17/06* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 8,560,128 | B2 * | 10/2013 | Ruff | ................... G06F 3/04842 |
| | | | | 700/278 |
| 9,241,270 | B1 * | 1/2016 | Logue | .................... G06F 21/44 |
| 10,223,613 | B2 * | 3/2019 | Behringer | ............ G06F 16/435 |
| 10,650,647 | B2 * | 5/2020 | Horling | ................ G08B 15/002 |
| 10,872,601 | B1 * | 12/2020 | Acharya | ............... G06F 40/295 |
| 10,896,679 | B1 * | 1/2021 | Hu | ............................ G06N 3/08 |
| 11,100,384 | B2 * | 8/2021 | Finkelstein | .............. G06N 5/04 |
| 11,381,686 | B2 * | 7/2022 | Scalisi | ............... H04L 12/2825 |
| 11,386,905 | B2 * | 7/2022 | Ding | ........................ G06F 3/167 |
| 11,521,038 | B2 * | 12/2022 | Lee | ....................... G06V 40/172 |
| 11,551,103 | B2 * | 1/2023 | Cook | ..................... G06N 20/00 |

(Continued)

*Primary Examiner* — Hua Lu

(74) *Attorney, Agent, or Firm* — Pierce Atwood LLP

(57) ABSTRACT

Techniques for presenting personalized content to a user are described. A smart home system may determine activity data (including present activity data and device usage history) specific to interactions involving a first device, and generate activity embedding data representing the activity data. The smart home system may also receive a first list content for presentment, and generate a second list of content using the first list and the activity embedding data. The smart home system may send the second list to the first device. The first device may determine a third list of content based on the second list and an identify of a user presently interacting with the first device, such that the third list of content is specific to interactions involving the first device and the user. The first device may then present at least one instance of content represented in the third list.

22 Claims, 13 Drawing Sheets

Environment
102

(56) References Cited

U.S. PATENT DOCUMENTS

| | | | |
|---|---|---|---|
| 11,704,898 B2 * | 7/2023 | Jelveh | G06F 18/41 |
| | | | 382/159 |
| 11,743,070 B2 * | 8/2023 | Koch | H04L 12/282 |
| | | | 700/19 |
| 11,908,465 B2 * | 2/2024 | Sohn | G10L 17/22 |
| 11,941,114 B1 * | 3/2024 | Bunker | G08B 13/19691 |
| 2014/0108019 A1 * | 4/2014 | Ehsani | G10L 21/06 |
| | | | 704/275 |
| 2015/0163412 A1 * | 6/2015 | Holley | H04L 12/2827 |
| | | | 348/143 |
| 2016/0259308 A1 * | 9/2016 | Fadell | G05B 15/02 |
| 2017/0191693 A1 * | 7/2017 | Bruhn | F24F 11/58 |
| 2019/0266886 A1 * | 8/2019 | Jiang | H04W 4/021 |
| 2019/0267004 A1 * | 8/2019 | Lee | G10L 21/0208 |
| 2019/0349213 A1 * | 11/2019 | Shive | G05B 15/02 |
| 2019/0373299 A1 * | 12/2019 | Matthews | H04W 12/65 |
| 2020/0014552 A1 * | 1/2020 | Tan | H04L 12/2809 |
| 2020/0142470 A1 * | 5/2020 | Edwards | G06Q 20/204 |
| 2020/0142495 A1 * | 5/2020 | Steinberg | G06V 40/18 |
| 2020/0184967 A1 * | 6/2020 | Gupta | B60K 35/10 |
| 2020/0285841 A1 * | 9/2020 | Goulden | G08B 13/19684 |
| 2020/0293818 A1 * | 9/2020 | Bapat | G08B 13/1966 |
| 2020/0312279 A1 * | 10/2020 | Sage | G09G 3/32 |
| 2021/0006750 A1 * | 1/2021 | Scalisi | G06F 3/167 |
| 2021/0266326 A1 * | 8/2021 | Chen | H04L 67/52 |
| 2021/0326421 A1 * | 10/2021 | Khoury | G10L 17/08 |
| 2022/0006664 A1 * | 1/2022 | Emigh | H04L 12/282 |
| 2022/0030033 A1 * | 1/2022 | Ojha | H04W 12/69 |
| 2022/0189223 A1 * | 6/2022 | Carter | H04N 7/186 |
| 2022/0278867 A1 * | 9/2022 | Lee | H04L 12/282 |

* cited by examiner

Figure 1A:
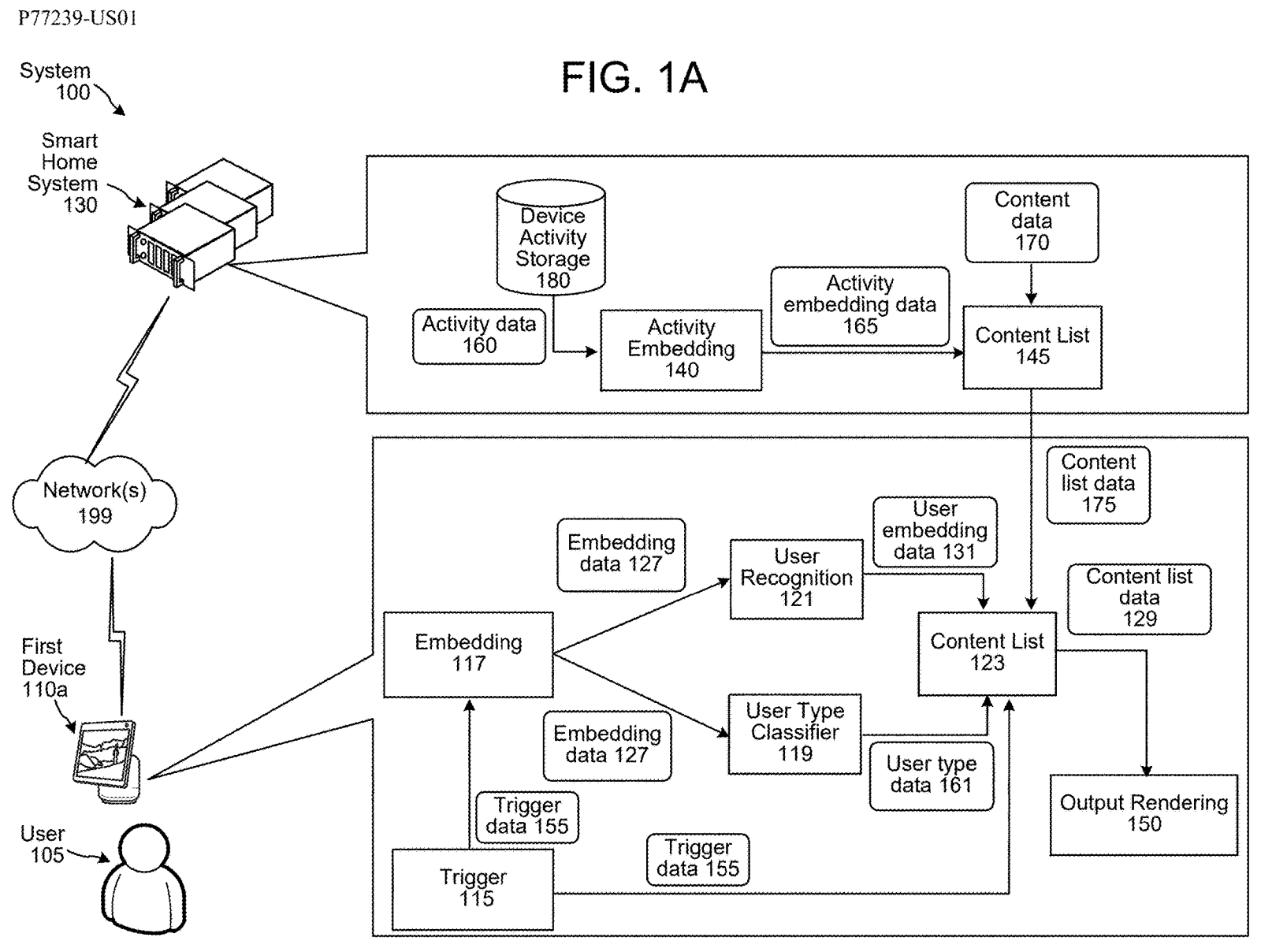

System 100

Smart Home System 130

Content data 170

Content List 145

Activity embedding data 165

Activity Embedding 140

Device Activity Storage 180

Activity data 160

Content list data 175

Content list data 129

Output Rendering 150

User embedding data 131

Content List 123

User type data 161

User Recognition 121

User Type Classifier 119

Embedding data 127

Embedding data 127

Trigger data 155

Embedding 117

Trigger data 155

Trigger 115

Network(s) 199

First Device 110a

User 105

Figure 9:
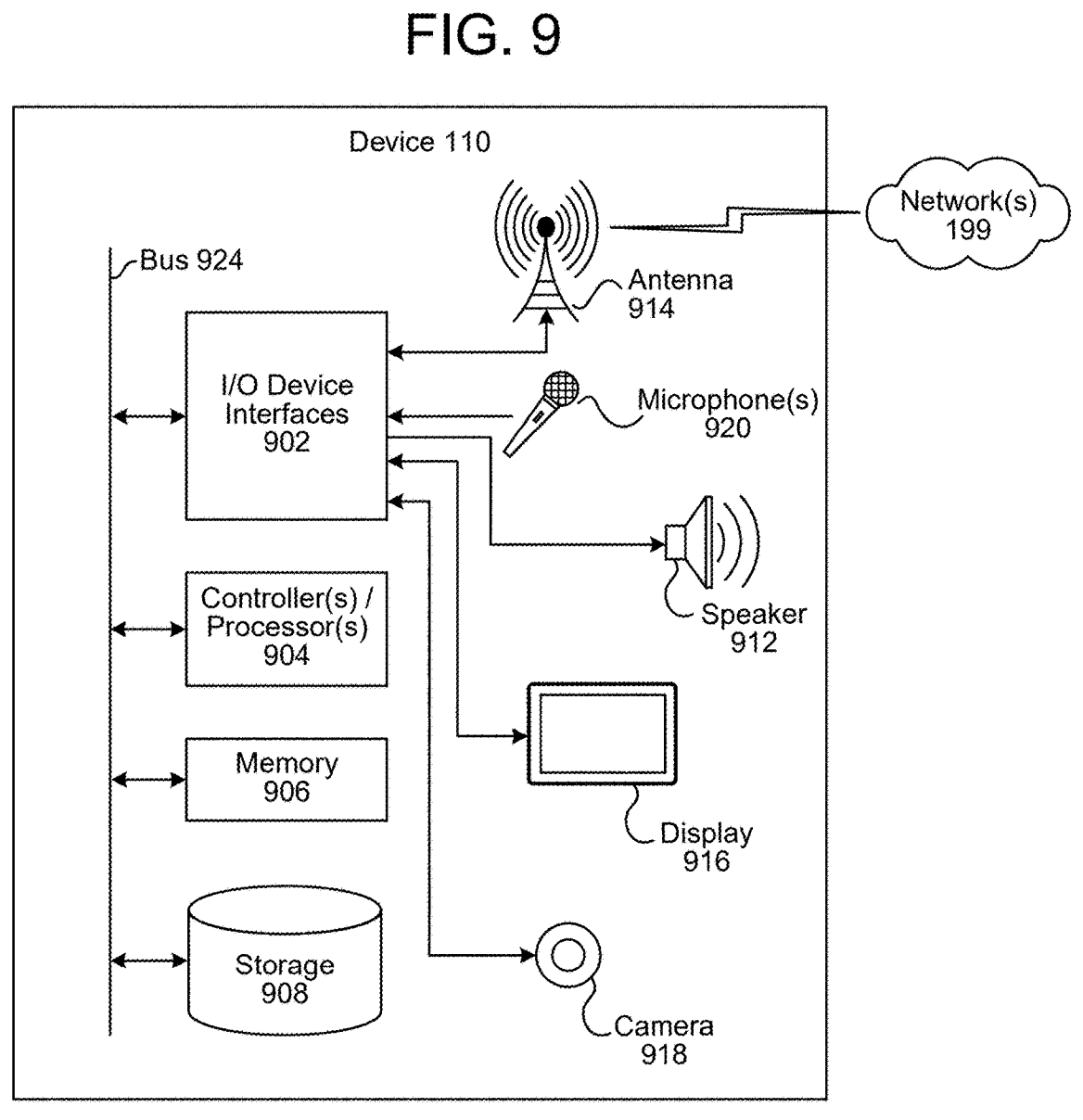

Network(s) 199

Device 110

Antenna 914

Microphone(s) 920

Speaker 912

Display 916

Camera 918

Bus 924

I/O Device Interfaces 902

Controller(s) / Processor(s) 904

Memory 906

Storage 908

FIG. 10

System 120/130

Bus 1024

Network(s) 199

I/O Device Interfaces 1002

Controller(s) / Processor(s) 1004

Memory 1006

Storage 1008

FIG. 11

PROACTIVE PRESENTMENT OF PERSONALIZED ACTIVITY RECOMMENDATIONS

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system for generating and presenting a list of options and/or other content personalized to a device and user thereof, according to embodiments of the present disclosure.

FIG. 5 is a conceptual diagram of components of a device, according to embodiments of the present disclosure.

FIG. 8 is a system flow diagram illustrating speech-based user recognition processing, according to embodiments of the present disclosure.

FIG. 9 is a block diagram conceptually illustrating example components of a device, according to embodiments of the present disclosure.

FIG. 10 is a block diagram conceptually illustrating example components of a system, according to embodiments of the present disclosure.

FIG. 11 illustrates an example of a computer network for use with the overall system, according to embodiments of the present disclosure.

DETAILED DESCRIPTION

Figure 1B:
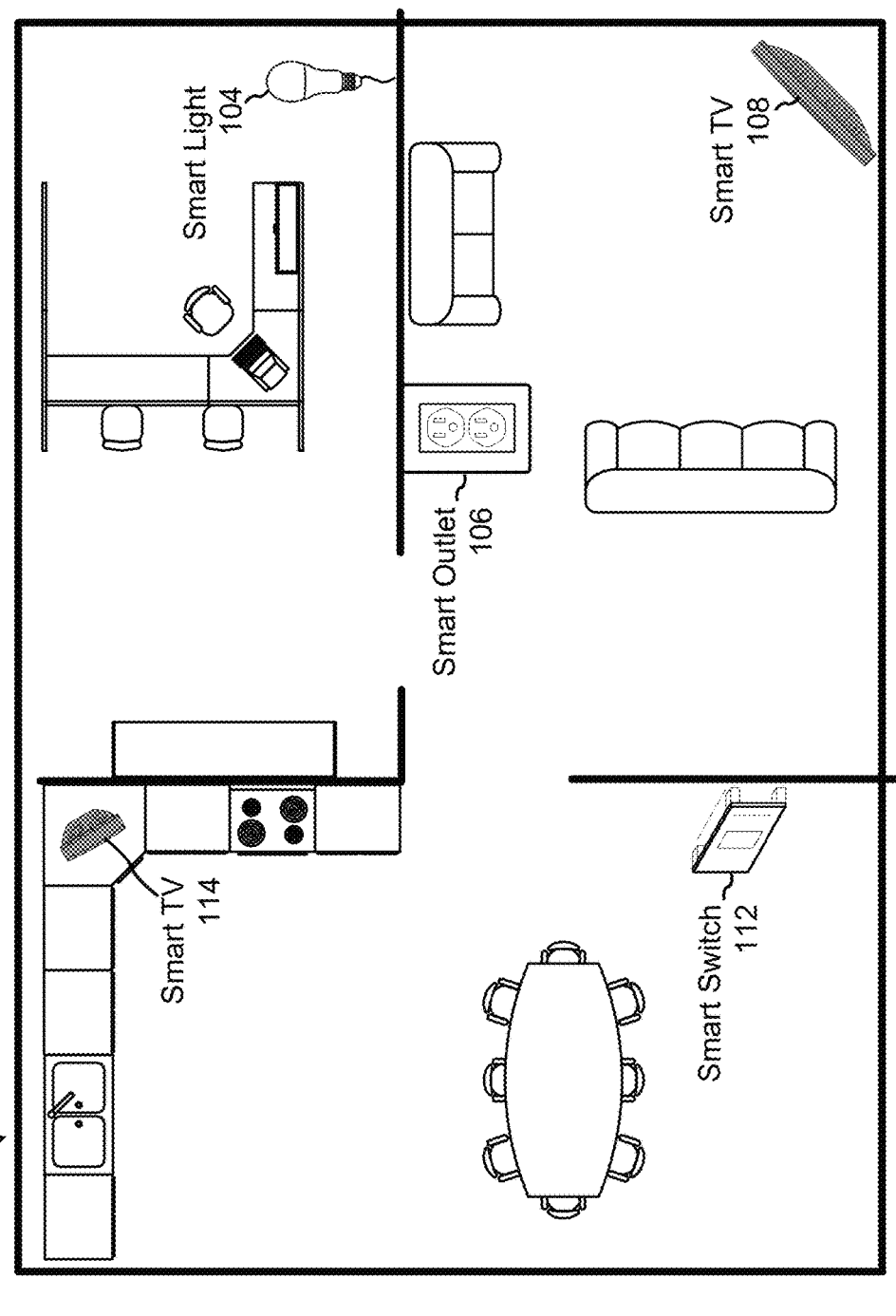
FIG. 1B is a conceptual diagram illustrating an example layout of devices in an environment, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

An environment (e.g., a house, an apartment, an office, etc.) may include one or more smart home devices. As used herein, a "smart home device" refers to a device that may be controlled by another device or system in response to receiving a user input (e.g., a spoken input or GUI input). Example smart home devices include, but are not limited to, light switches, TVs, plugs, outlets, light bulbs, motion sensors, speakers, door locks, window locks, garage doors, ovens, temperature sensors, and thermostats.

A user may utilize one or more smart devices of an environment on a frequent basis and may do so in a recognizable pattern. For example, the user may routinely utilize a smart speaker to play a radio station at a particular time of day. For further example, a user may routinely dim smart lights in a living room and turn on a TV in the living at a particular time of day on a particular day of the week.

The present disclosure provides techniques for displaying or otherwise presenting (e.g., using a voice interface) a list of options and/or other content to a user such that the user can more easily invoke system processing or other functionality with respect to the presented content. For example, such a list of options and/or other content may include smart home device names corresponding to smart home devices within the user's environment, routine names corresponding to routines that the user can configure or has already configured, action names corresponding to actions that the user can request, playlist names corresponding to music or other media playlists, media (e.g., songs, movies, etc.), etc. As used herein, a "routine" refers to a group of actions (e.g., skill component processing) to be performed in response to a single user input. As used herein, an "action" refers to processing performed by a device or other system component (e.g., a skill component as discussed herein) to produce an output to a user.

A device may determine that the list of content is to be presented based on various triggers. For example, the device may detect a face in a captured image or capture device-directed speech and, in response, determine that the list of content is to be output. While the list of content is output, the user may select (e.g., via a voice or touch input) a particular item in the content to invoke/execute it. For example, while a list of one or more routines can be output, a user may say "start movie night routine" to cause a "movie night routine"

to be performed. For further example, the user may touch the "movie night routine" item in the output content to cause the routine to be performed. This improves the user experience, as the user may forget the specific routine name, and the displayed list provides a reminder.

Before determining a list of content is to be output, the device may receive, from a smart home system, a list of options or other content based on activity data associated with the device. Activity data may indicate a present (smart home) device state, a present action being performed, a past usage history for one or more (smart home) devices associated with the device, present weather conditions, etc. The smart home system may determine the ranked list by processing the activity data using an activity embedding component, and processing the resulting embedding with respect to a usage history associated with the device. As such, the list of options or other content may not be specific to any particular user. The smart home system sends the list of options or other content to the device with respect to which it was generated.

After receiving the list of options or other content, the device may identify a user presently interacting with the device, generate a second list of options or other content based on the user identity and the received list of options or other content, and display some or all of the second list. For example, the device may identify the user using face recognition processing, speech-based user recognition processing, and/or another user-recognition technique. The device may determine a usage history associated with the recognized user, and generate the second list of options or other content by altering the initial list (generated by the smart home system) based on the usage history of the recognized user.

In some embodiments, the device may determine a detected user is a child (without necessarily determining the identity of the child). For example, the device may use a classifier trained to determine whether input image data includes a representation of a child's face, generally, and/or based on other data generally representative of most children (e.g., relative height, sound of voice, quality of ASR data, etc.). The device may determine the second list based on the user being a child.

In some embodiments, the device may include an ambient display screen (or display screen portion), which persistently displays content. The device may determine and display the second list upon determining a certain period of time has elapsed since the device last determined and displayed ranking list of options or other content.

Teachings of the present disclosure provide, among other things, an improved user experience by visually presenting contextualized content that may be of interest to the user, as well as increased user privacy as teachings of the present disclosure limit the data needed to be output from a device in order to rank content (as an initial list of content is provided to a device, and the device may rank the content locally using user-specific information).

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates a system 100 for generating and presenting a list of options and/or other content personalized to a device and user thereof. The system 100 may include a first device 110a, local to a user 105, in communication with a smart home system 130 via a network(s) 199. The network (s) 199 may include the Internet and/or any other wide- or local-area network, and may wired, wireless, and/or cellular network hardware.

The smart home system 130 may include various components. With reference to FIG. 1A, the smart home system 130 may include a device activity storage 180, an activity embedding component 140, and a content list component 145.

The device activity storage 180 may include smart home device identifiers associated with corresponding present device states, present actions being performed by the smart home devices, usage history data representing previous device states and previous actions performed by the smart home devices, and/or other contextual information, such as present weather conditions (e.g., as output by a "smart" weather sensor).

Different smart home devices may have different states. For example, a smart light may have an off state, an on state, and/or a brightness level state. For further example, a smart switch may have an off state, an on state, and/or a brightness level state. As another example, a smart outlet may have an off state or an on state. For further example, a smart TV may have an off state or an on state, and the on state may further indicate a present volume level of the smart TV. As another example, a smart speaker may have an off state or an on state, and the on state may further indicate a present volume level of the smart speaker. For further example, a smart door lock may have an unlocked state or a locked state. As another example, a smart temperature sensor may have an off state or an on state, and the on state may further indicate a present temperature determined by the smart temperature sensor. For further example, a smart thermostat may have an off state, a cooling state, a heating state, or a cooling/heating state (and the cooling, heating, and cooling/heating states may further indicate a present temperature). As another example, a smart motion sensor may include an off state or an on state, and the on state may further indicate whether or not motion is presently detected by the smart motion sensor.

Users may interact with smart home devices, and cause said smart home devices to perform actions, using user inputs received by one or more devices (e.g., the first device 110a, a second device 110b, a third device 110c, etc.). The device activity storage 180 may associate a device state, action performed by a device, etc. with a device identifier of the device 110 that received the user input resulting in the device state, performed action, etc. The device activity storage 180 may store present devices states of (smart home) devices.

The smart home system 130 may retrieve activity data 160 associated with a device identifier of the first device 110a. As such, this activity data 160 may not be specific to any particular user. The smart home system 130 may input the activity data 160 to the activity embedding component 140.

The activity embedding component 140 is configured to take as input the activity data 160 and generate activity embedding data 165 representing the various smart home device names and corresponding devices states, device actions, past usage history, and/or other contextual information included in the activity data 160. The activity embedding data 165 may correspond to multiple smart home devices. For example, the activity embedding data 165 may include first activity embedding data corresponding to a first smart home device, second activity embedding data corresponding to a second smart home device, etc. In some embodiments, the activity embedding data corresponding to different smart home devices may be included in the activity embedding data 165 as separate vectors or matrices. In other embodiments, the activity embedding data corresponding to different smart home devices may be concatenated and included in the activity embedding data 165.

FIG. 1B illustrates example smart home devices that may be located within an environment. Referring to FIG. 1B, the environment 102 may include a smart light 104, a smart outlet 106, a smart TV 108, a smart switch 112, and a smart TV 114. Additional example smart home devices (not illustrated in FIG. 1B) that may be included in the environment 102 are speakers, door locks, temperature sensors, thermostats, and motion sensors.

Referring again to FIG. 1A, in some embodiments, the activity embedding component 140 may employ a machine learning (ML) model (e.g., an encoder). In some embodiments, the activity embedding component 140 may be a neural network where the last hidden layer is an embedding layer. In some embodiments, the neural network may be trained using various examples of activity data (e.g., smart home device names and corresponding device states, device actions, past usage history, and/or other contextual information).

The activity embedding component 140 may be trained to identify patterns in activity training data. In some embodiments, the activity training data may include smart home device names and corresponding potential device states, example actions, and example contextual information. For example, activity training data for a smart TV may include the device name "smart TV" associated with {state: ON}; "smart TV" associated with {state: OFF}; "smart TV" associated {state: ON; volume: <value>}, "smart TV" associated with {action: "movie"}, and {context: "raining"}, etc. The activity embedding component 140 may be trained to identify the patterns such that the activity embedding component 140 may output the same activity embedding data for given activity data. The activity embedding component 140 may determine a corresponding probability for the activity data 160 corresponding to each pattern, and may output the activity embedding data 165 corresponding to the top scoring pattern. In some embodiments, the activity embedding component 140 may implement one or more attention models. For example, the attention models may be trained to assign weights to activity data based on the patterns.

Training of the activity embedding component 140 may require establishing a "ground truth" for training examples. In ML, the term "ground truth" refers to the accuracy of a training set's classification for supervised learning techniques. The activity embedding component 140 may be trained using various techniques including backpropagation, statistical learning, supervised learning, semi-supervised learning, stochastic learning, or other known techniques.

The activity embedding component 140 may send the activity embedding data 165 to the content list component 145. Additionally, the content list component 145 may receive content data 170. The content data 170 may include a plurality of content (e.g., smart home device names corresponding to smart home devices, routine names corresponding to routines, action names corresponding to actions, playlist names corresponding to music or other media playlists, media (e.g., songs), etc.) for presentment (e.g., via display and/or audio output) the first device 110a.

In some embodiments, the content, represented in the content data 170, may be ranked based on frequency of use/performance by users of the first device 110a. In some embodiments, the content data 170 may be generated in response to a change in the user profile and/or group profile corresponding to the first device 110a. For example, the content data 170 may be determined in response to determining that new content (e.g., a new smart home device, new playlist, new song, etc.) has been added to the user and/or group profile. For further example, the content data 170 may be determined in response to determining that content (e.g., a smart home device, playlist, song, etc.) has been removed from the user and/or group profile. As another example, the content data 170 may be determined on a periodic basis.

The content list component 145 may be configured to generate content list data 175 using the activity embedding data 165 and the content data 170. In some embodiments, the content list component 145 may implement priors to determine the content list data 175 based on the activity embedding data 165 and the content data 170. In some embodiments, the content list component 145 may implement the priors using a Naïve Bayes method. For example, the content list component 145 may rank the content, included in the content data 170 using pre-defined probabilities. The pre-defined probabilities may be defined using indications of past activation(s) and deactivation(s) of smart home devices, such as an indicator of the identity of the smart home device, the state(s) of the device at the time of the activation(s)/ deactivation(s), the time of activation(s)/deactivation(s) of the smart home device, action(s) performed by the smart home device, and contextual information.

The content list component 145 may determine, for each instance of content in the content data 170, a corresponding value (e.g., score) representing relevance of the content based on the activity embedding data 165 specific to the first device 110a. In the example where the content data 170 includes a list of smart home device names, a foregoing score may represent a likelihood that the first device 110a will receive a user input referencing a smart home device in the near future. In the example where the content data 170 includes song names, a foregoing score may represent a likelihood that the first device 110a will receive a user input requesting output of a corresponding song in the near future. In the example where the content data 170 includes playlist names, a foregoing score may representing a likelihood that the first device 110a will receive a user input requesting output of a corresponding playlist in the near future. In the example where the content data 170 includes routine names, a foregoing score may representing a likelihood that the first device 110a will receive a user input requesting performance of a corresponding routine in the near future. The content list component 145 may determine a foregoing value based on the usage history data included in the activity data 160 specific to the first device 110a. For example, if the content data 170 includes the name of a smart home device, and the content list component 145 determines the smart home device is frequently interacted with at a present time of day, day of week, etc. as represented in the activity embedding data 165, the content list component 145 may include the smart home device name in the content list data 175 (and optionally increase a ranking of the smart home device name as compared to its position within the content data 170), and vice versa. For further example, if the content data 170 includes the name of a smart home device, and the content list component 145 determines the smart home device has been recently added to the user/group profile corresponding to the first device 110*a*, the content list component 145 may include the smart home device name in the content list data 175 (and optionally increase a ranking of the smart home device name as compared to its position within the content data 170). For further example, if the content data 170 includes the name of a song, and the content list component 145 determines the song is frequently played at a present time of day, day of week, etc. as represented in the activity embedding data 165, the content list component 145 may include the song name in the content list data 175 (and optionally increase a ranking of the song name as compared to its position within the content data 170), and vice versa. As another example, if the content data 170 includes the name of a routine, and the content list component 145 determines the routine is frequently performed at a present time of day, day of week, etc. as represented in the activity embedding data 165, the content list component 145 may include the routine name in the content list data 175 (and optionally increase a ranking of the routine name as compared to its position within the content data 170), and vice versa. For further example, if the content data 170 includes the name of a routine, and the content list component 145 determines the routine includes powering on a smart home device and that the present state of the smart home device indicates that the smart home device is powered off, the content list component 145 may include the routine name in the content list data (and optionally increase a ranking of the routine name as compared to its position within the content data 170), and vice versa.

The content list component 145 may use the pre-defined probabilities, the activity embedding data 165, and the content data 170 to generate the content list data 175. In some cases, the content list data 175 may correspond to the entirety of the content represented in the content data 170, but having a different ranking/ordering than as represented in the content data 170.

As described above, the content list component 145 may implement priors in some embodiments. In some embodiments, the content list component 145 may implement one or more ML models. The ML model(s) is not limited to any particular type of ML model. The ML model(s) may be configured according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

Generating the ML model(s) of the content list component 145 may require establishing a "ground truth" for training examples. The ML model(s) may be trained using various techniques including backpropagation, statistical learning, supervised learning, semi-supervised learning, stochastic learning, or other known techniques. As the activity embedding data 165, processed by the content list component 145, is not specific to any particular user (but rather is specific to the first device 110*a*), it will be appreciated that the content list data 175 corresponds to a list of content irrespective of the identity of the user interacting with the first device 110*a*. The content list component 145 may send the content list data 175 to the first device 110*a*.

The first device 110*a* may include various components. With reference to FIG. 1A, the first device 110*a* may include one or more trigger components (collectively illustrated as a trigger component 115), an embedding component 117, a user type classifier 119, a user recognition component 121, a content list component 123, and an output rendering component 150.

In some embodiments, the first device 110*a* may cause all or a portion of the content, represented in the content list data 175, to be presented (e.g., visually and/or audibly) upon the first device 110*a* receiving the content list data 175. In some embodiments, the first device 110*a* may wait to present content until a trigger event is determined.

The trigger component 115 of the first device 110*a* may be configured to determine the occurrence of a trigger event. The trigger component 115 may determine that content is to be output based on determining the trigger event has occurred. In some embodiments, the trigger component 115 may determine the trigger event has occurred upon determining that the user 105 has navigated to a particular graphical user interface (GUI) screen (e.g., a smart home devices page) on the first device 110*a*. In some embodiments, the trigger component 115 may determine the trigger event has occurred upon determining that image data (captured by one or more cameras of or otherwise associated with the first device 110*a*) includes a representation of a user face. For example, the trigger component 115 may use any art-/industry-known face detection technique (executed, for example, by an object detection component) to identify a representation of a face in the image data. In some embodiments, the trigger component 115 may determine the trigger event has occurred upon determining that audio data (corresponding to audio captured by one or more microphones of or otherwise associated with the first device 110*a*) includes speech directed to the first device 110*a*. For example, the trigger component 115 may determine audio data includes device-directed speech based at least in part on the speech including a wakeword configured to cause the first device to transition from a lower-power (sleep) mode to a higher-power (awake) mode. An example wakeword is "Alexa." In some embodiments, the first device 110*a* may be configured to continuously present content on a display of the first device 110*a* (i.e., display content in an ambient manner). In such embodiments, the trigger component 115 may determine that the trigger event has occurred upon determining that a particular period of time has elapsed (e.g., 30 seconds, a minute, 5 minutes, 10 minutes, 15 minutes, 30 minutes, an hour, etc.). In some embodiments, the trigger component 115 may determine that the trigger event has occurred upon detecting motion of an object within a vicinity of the first device 110*a* using one or more motion sensors. In some embodiments, the trigger component 115 may determine that the trigger event has occurred upon detecting a wireless (e.g., Bluetooth) signal emitted from a device known to the trigger component 115. In some embodiments, the trigger component 115 may determine that the trigger event has occurred upon detecting a wearable device's service set identifier (SSID) (e.g., a smart watch SSID, phone SSID, and/or driver's license radio frequency (RFID)). In some embodiments, the trigger component 115 may determine that the trigger event has occurred upon detecting a fingerprint of the user 105 using a fingerprint sensor. In some embodiments, the trigger component 115 may determine that the trigger event has occurred upon detecting a palm of the user 105 using a palm scanner (e.g., Amazon One palm scanner). In some embodiments, the trigger component 115 may determine that the trigger event has occurred upon detecting a barcode using a barcode scanner (e.g., Amazon Just Walk Out). In some embodiments, the trigger component 115 may determine that the trigger event has occurred upon receiving data representing the height of an object detected by a camera and/or other sensor associated with the first device 110a. In some embodiments, the trigger component 115 may determine that the trigger event has occurred upon receiving data representing the gait of the user 105 as detected using the camera associated with the first device 110a. In some embodiments, the trigger component 115 may determine that the trigger event has occurred upon receiving data representing a hair color and/or hair length of the user 105 as detected using the camera associated with the first device 110a. In some embodiments, the trigger component 115 may determine that the trigger event has occurred upon receiving data representing that another device has identified the user 105. One skilled in the art will appreciate that the foregoing event trigger scenarios are merely illustrative, and that the present disclosure covers other situations in which the trigger component 115 may determine that the trigger event has occurred.

Upon determining that a trigger event has occurred, the trigger component 115 may send trigger data 155 to the embedding component 117. The trigger data 155 may include, for example, an identifier corresponding to the trigger component 115 (to identify which trigger component 115 detected the trigger event), and trigger context data. The trigger context data may include data representing the cause of the trigger component 115 determining occurrence of the trigger event. For example, the trigger context data may include data representing a GUI of the first device 110a was navigated to a particular screen (e.g., a smart home devices page), image data including a representation of a face, audio data including device-directed speech, data representing a period of time has elapsed, motion sensor data, data representing a wireless (e.g., Bluetooth) signal identifying another device, etc.

The embedding component 117 is configured to take as input the trigger data 155 and generate embedding data 127 representing characteristics of the user as represented in the trigger data 155. As described previously, in some instances the trigger data 155 may include image data including a representation of a face. In such instances, the embedding component 117 may process the image data to determine the embedding data 127 to represent facial features of the face. As also described previously, in some instances the trigger data 155 may include audio data including device-directed speech. In such instances, the embedding component 117 may process the audio data to determine the embedding data 127 to represent speech characteristics of the device-directed speech.

The embedding component 117 may be trained to generate the embedding data 127 to represent features that are most useful in distinguishing which user provided the input. Thus, the embedding component 117 may be trained to generate the embedding data 127 to represent facial features that are most useful in determining user identity, generate the embedding data 127 to represent speech characteristics that are most useful in determining user identity, etc.

In some embodiments, the first device 110a may be configured with more than one embedding component 117, where each embedding component 117 is configured to generate a different type of embedding data 127. For example, the first device 110a may implement a first embedding component configured to receive trigger data including image data, and output embedding data 127 representing facial features; and may implement a second embedding component configured to receive trigger data including audio data, and output embedding data 127 representing speech characteristics.

In some embodiments, the embedding component 117 may employ a ML model. In some embodiments, the embedding component 117 may be a neural network where the last hidden layer is an embedding layer. The ML model may be configured to output embedding data 127 representing features and/or characteristics of a user 105 represented in trigger data 155. For example, for an embedding component 117 that is configured to receive trigger data including image data, and output embedding data 127 representing facial features, the embedding component 117 may implement an ML model configured to output embedding data 127 representing facial features. To configure the ML model to output embedding data 127 representing facial features, the ML model may be trained using various examples of image data including representations of faces of different users, and the ML model may be trained to identify facial features for distinguishing between users. For further example, for an embedding component 117 configured to receive trigger data including audio data, and output embedding data 127 representing speech characteristics, the embedding component 117 may implement an ML model configured to output embedding data 127 representing speech characteristics. To configure the ML model to output embedding data 127 representing speech characteristics, the ML model may be trained using various examples of audio data including speech of different users, and the ML model may be trained to identify speech characteristics for distinguishing between users.

The embedding component 117 may send the embedding data 127 to the user type classifier 119. The user type classifier 119 is configured to take as input the embedding data 127 and generate user type data 161 representing whether the embedding data 127 corresponds to a child user type, generally (without making a determination as to a particular child the embedding data corresponds), or an adult user type (or other age group(s) depending on the system configuration).

In some embodiments, the user type classifier 119 may determine the embedding data 127 corresponds to a child user type using features of generally known child users (abiding by appropriate laws, rules, and regulations). In some embodiments, where the embedding data 127 corresponds to facial features, the user type classifier 119 may determine whether the embedding data 127 corresponds to a child user type using facial features known to be associated with children (e.g., determine whether the facial feature sizing and spacing, represented in the embedding data 127, corresponds to facial feature sizing and spacing traditionally associated with children). In some embodiments, where the embedding data 127 corresponds to speech characteristics, the user type classifier 119 may determine whether the embedding data 127 corresponds to a child user type using speech characteristics known to be associated with children (e.g., determine whether the tone, pitch, etc. of speech, represented in the embedding data 127, corresponds to tone, pitch, etc. traditionally associated with children).

The user type classifier 119 may send the user type data 161 to the content list component 123. In some embodiments, in response to the content list component 123 determining the user type data 161 indicates the present user is likely a child, the content list component 123 may generate content list data 129 to correspond to a portion of the content list data 175 deemed appropriate for child consumption. In other words, the content list component 123 may generate the content list data 129 to correspond to the content list data 175 with one or more instances of content, deemed not appropriate for child consumption, removed therefrom. For example, the content list component 123 may generate the content list data 129 to not include content including language deemed inappropriate for children, to not include content associated with controlling smart door locks, etc. In some embodiments, an adult user may set preferences specifying which content can and cannot be displayed for children.

Figure 1C:
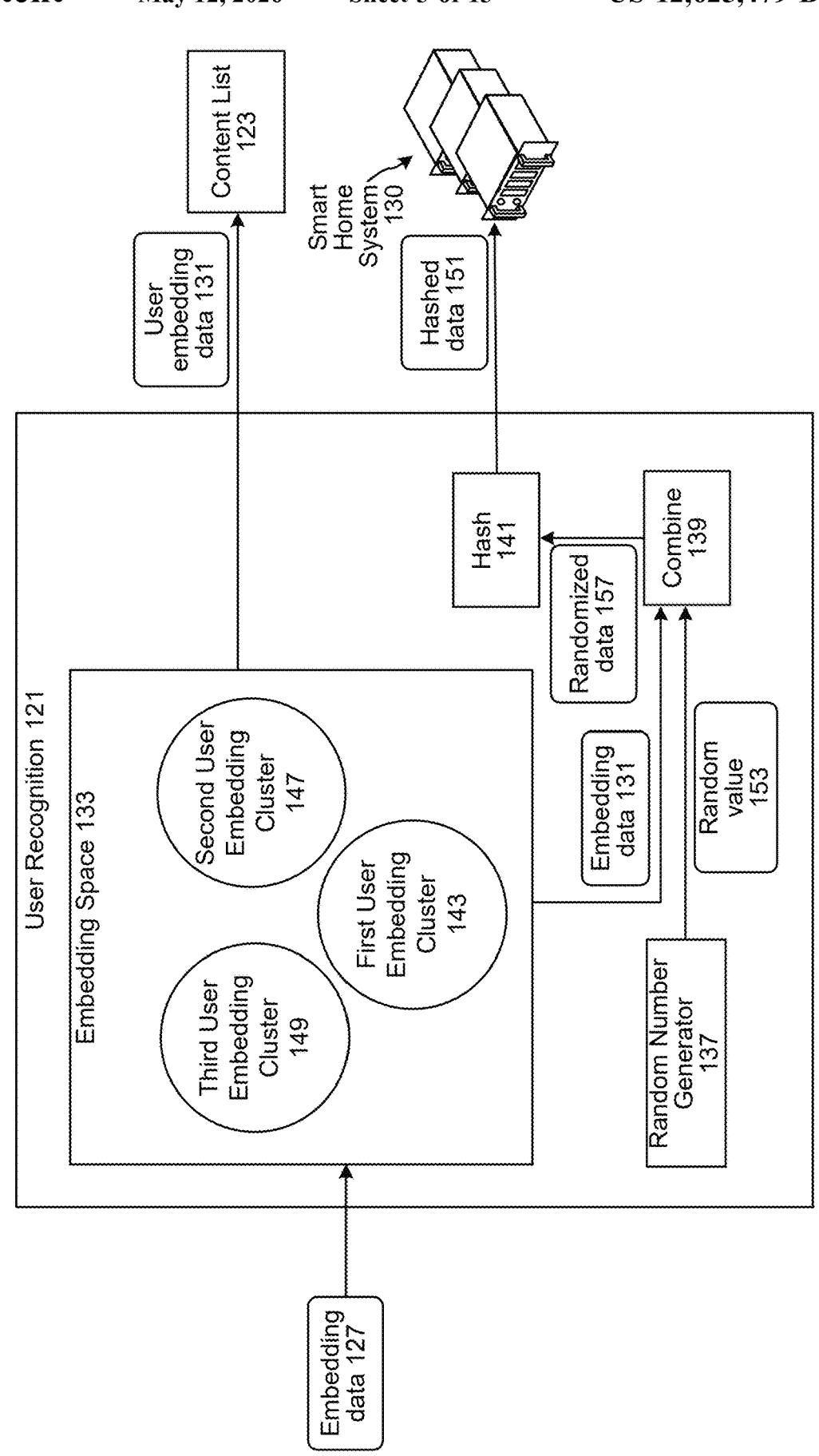
FIG. 1C is a conceptual diagram illustrating processing that may be performed by a user recognition component of a device, according to embodiments of the present disclosure.

In addition to or instead of sending the embedding data 127 to the user type classifier 119, the embedding component 117 may send the embedding data 127 to the user recognition component 121. The user recognition component 121 is configured to take as input the embedding data 127 and output embedding data 131 corresponding to the particular user 105 presently interacting with the first device 110a. FIG. 1C illustrates example components and processing of the user recognition component 121.

As shown in FIG. 1C, the user recognition component 121 may include an embedding space 133, a random number generator 137, a combine component 139, and a hash component 141.

At runtime and/or during a user recognition training process, the user recognition component 121 may receive embedding data corresponding to a user input, and may store the embedding data in the embedding space 133. Over time, two or more clusters of like embedding data may form, where each cluster corresponds to embedding data generated from user inputs of a different user. For example, as illustrated in FIG. 1C, the embedding space 133 may store a first user embedding cluster 143 including embedding data corresponding to a first user, a second user embedding cluster 147 including embedding data corresponding to a second user, and a third user embedding cluster 149 including embedding data corresponding to a third user. It will be appreciated that the embedding space 133 may store two, three, four, or more user embedding clusters depending upon the number of users that provide user inputs.

In some embodiments, the embedding space 133 may store facial feature embedding data. In some embodiments, the embedding space 133 may store speech characteristic embedding data. In embodiments where the trigger data 155 may include image data including a representation of a face and/or audio data including device-directed speech, the user recognition component 121 may include a facial feature embedding space and a speech characteristic embedding space.

The user recognition component 121 may receive the embedding data 127 and determine whether the embedding data 127 corresponds to a cluster in the embedding space 133. The embedding space 133 may output user embedding data 131 corresponding to a user embedding cluster determined to correspond to the embedding data 127. In some embodiments, the user embedding data 131 may be a center embedding of the embedding cluster determined to correspond to the embedding data 127. In some embodiments, the center embedding of the embedding cluster is determined by calculating a mean value of the embedding cluster. The user embedding data 131 may be input to the content list component 123.

In some instances, the first device 110a may be configured to send, to the smart home system 130 (or a system 120 described herein below), data representing the user 105. Rather than send the user embedding data 131 (corresponding to actual facial features, speech characteristics, etc. of the user 105) to the system 120/130, the first device 110a may be configured to send hashed data 151 to the system 120/130. For example, as illustrated in FIG. 1C, the user embedding data 131 may be input to a combine component 139 along with a random value 153. A random number generator 137 is configured to output the random value 153. For example, the random number generator 137 may be a cryptographically secure pseudorandom number generator (CSPRNG) (e.g., FIPS 186-4, NIST SP 800-90A, or other art-/industry-known CSPRNG). In some embodiments, the random value 153 may include alphanumeric characters. In some embodiments, the random value 153 may be of a length equal to the length of the hashed data 151 that the hash component 141 is configured to output. For example, if the hash component 141 is configured to output hashed data 151 of a length of 64 bytes, the length of the random value 153 may be of a length of 64 bytes. The combine component 139 is configured to take as input the user embedding data 131 and the random value 153, and to output randomized data 157 for the purpose of anonymizing the user embedding data 131. In some embodiments, the randomized data 157 represents the user embedding data 131 combined with the random value 153 (e.g., by concatenation).

The randomized data 157 may be sent to the hash component 141. The hash component 141 may take as input the randomized data 157 and output hashed data 151 (which may be sent to the system 120/130). In some embodiments, the hash component 141 may include a cryptographically secure hash function (e.g., SHA 2, SHA 3, bcrypt or other art-/industry-known hash function). By sending the hashed data 151 to the system 120/130, the system 120/130 may effectively be prevented from determining the exact identity of the user 105 while still permitting the system 120/130 to customize its processing to the user 105.

Referring again to FIG. 1A, the content list component 123 may receive the user embedding data 131 from the user recognition component 121 in addition to or instead of receiving the user type data 161 from the user type classifier 119. Accordingly, it will be appreciated that the content list component 123 may generate the content list data 129 based on the user type data 161 (as described above) in addition to or instead of the user embedding data 131 as described as follows.

The content list component 123 may communicate with a user usage history storage, of the first device 110a (not illustrated), storing, among other things, user input-system output pairs, where each pair is associated with a user identifier (e.g., user embedding data) of the user that provided the user input (e.g., associated with user embedding data corresponding to a center of a user embedding cluster of the user that provided the user input). The content list component 123 may query the user usage history storage for user usage history data (e.g., user input-system output pairs) associated with the user embedding data 131. The content list component 123 may generate the content list data 129 based on the content list data 175 and the received user usage history data associated with the user embedding data 131. In some embodiments, the content list component 123 may further generate the content list data 129 based on the trigger data 155.

In some embodiments, the content list component 123 may implement priors to generate the content list data 129 based on the content list data 175 and one or more of the user type data 161 and the aforementioned user usage history data associated with the user embedding data 131 (and optionally the trigger data 55). In some embodiments, the content list component 123 may implement priors using a Naïve Bayes method. For example, the content list component 123 may generate the content list data 129, using pre-defined probabilities (i) conditioned on the specific user 105 corresponding to the usage history data and/or (ii) conditioned on the user type data 161.

The content list component 123 may determine, for each instance of content in the content list data 175, a corresponding value (e.g., score) representing relevance of the content to the specific user 105. For example, a foregoing score may represent a likelihood that the specific user 105 will interact with a corresponding smart home device in the near future, a likelihood that the specific user 105 will request output of a corresponding song in the near future, a likelihood that the specific user 105 will request output of a corresponding playlist in the near future, a likelihood that the specific user 105 will request performance of a corresponding routine in the near future, etc. The content list component 123 may determine a foregoing value based on the usage history data specific to the particular user 105. For example, if the content list data 175 includes the name of a smart home device, and the content list component 123 determines the smart home device is frequently interacted with, by the specific user 105, at a present time of day, day of week, etc. as represented in the user usage history data, the content list component 123 may include the smart home device name in the content list data 129 (and optionally increase a ranking of the smart home device name as compared to a position of the smart home device name within the content list data 175), and vice versa. For further example, if the content list data 175 includes the name of a song, and the content list component 123 determines the song is frequently played, at a request of the specific user 105, at a present time of day, day of week, etc. as represented in the usage history data, the content list component 123 may include the song name in the content list data 129 (and optionally increase a ranking of the song name as compared to a position of the song name within the content list data 175), and vice versa. As another example, if the content list data 175 includes the name of a routine, and the content list component 123 determines the routine is frequently performed, at a request of the specific user 105, at a present time of day, day of week, etc. as represented in the user usage history data, the content list component 123 may include the routine name in the content list data 129 (and optionally increase a ranking of the routine name as compared to a position of the routine name within the content list data 175), and vice versa.

As described above, the content list component 123 may implement priors in some embodiments. In some embodiments, the content list component 123 may implement one or more ML models. The ML model(s) is not limited to any particular type of ML model. The ML model(s) may be configured according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

Generating the ML model(s) of the content list component 123 may require establishing a "ground truth" for training examples. The ML model(s) may be trained using various techniques including backpropagation, statistical learning, supervised learning, semi-supervised learning, stochastic learning, or other known techniques.

As the user usage history data, processed by the content list component 123, is specific to a particular user, it will be appreciated that the content list data 129 corresponds to a list of content generated (and in some instances ranked) with respect to the particular user 105 interacting with the first device 110*a*.

The content list data 129 may be input to the output rendering component 150. The output rendering component 150 may generate display data for presentment via a display and/or generate (or cause to be generated) audio data (including synthesized speech) for output via one or more speakers of or otherwise associated with the first device 110*a*. The display/audio data may include (or otherwise correspond to) one or more instances of content represented in the content list data 129. For example, in embodiments where the display data is to be presented via the display, the content list data 129 may include 8 different contents, and the display (or portion thereof) to be used to present the display data may only be able to simultaneously display 5 contents in a visually appealing manner to the user. In some embodiments, the first device 110*a* may be configured to receive a user input requesting the display of further content, at which point the output rendering component 150 may generate updated display data usable to present different content from the content list data 129. In other words, the first device 110*a* may be configured to display content and allow the user 105 to navigate across multiple "nested" screens (or screen portions) on the display of or otherwise associated with the first device 110*a*. In some embodiments, the displayed content may include a name for each particular item in the displayed content. For example, displayed content may include an item for a "Good Morning" routine and an item for a "Kitchen Light" device. In some embodiments, the displayed content may include a name and action for each particular item in the displayed content. For example, the displayed content may include an item "Here Comes the Sun by The Beatles" and an action for the item "Play".

The user 105 may invoke/execute a particular item in displayed content by providing a user input. In some embodiments, the user may invoke/execute a particular item in the displayed content by providing a touch input. For example, a user may use a touch input to select a "Living Room TV" item in the displayed content to power on the "Living Room TV." In some embodiments, the user may invoke/execute a particular item in the displayed content by providing a voice input. For example, the user may say "turn on the living room TV" to power on the "Living Room TV." The user 105 may perform various actions using the displayed content (e.g., power on/off a smart home device, cause a routine to be performed, play media, etc.)

In some embodiments, the first device 110*a* may be configured to perform one or more actions in response to the content list data 129 being output from the content list component 123. For example, the content list data 129 may include a smart home device name, and the first device 110*a* may cause the smart device (corresponding to the name) to be activated. In this example, the output rendering component 150 may present display data and/or audio data to indicate the smart device was activated. For further example, the content list data 129 may include a routine name, and the first device 110*a* may cause the routine (corresponding to the routine name) to be performed. In this example, the output rendering component 150 may present display data and/or audio data to indicate the routine is being (or was) performed. As such, it will be appreciated that the first device 110*a* may cause one or more actions to be performed in response to the content list data 129, without receiving a user input requesting performance of the one or more actions.

In situations where the first device 110*a* automatically (without receiving a user request) performs one or more actions based on the content list data 129, the user 1105 may be able to halt the execution of the one or more actions by providing a user input (e.g., via voice or by selecting a GUI element) to "stop" or "cancel" execution of the one or more actions. The first device 110*a* may display a selectable "undo" GUI element that, when selected by the user 105, results in the first device 110*a* undoing the automatically executed one or more actions.

In some embodiments, devices of the present disclosure may be configured to display content using a particular software/application version. In some embodiments, the first device 110*a* may display content using a JSON-based HTML5 language, an example of which is Alexa Presentation Language (APL).

Figure 2:
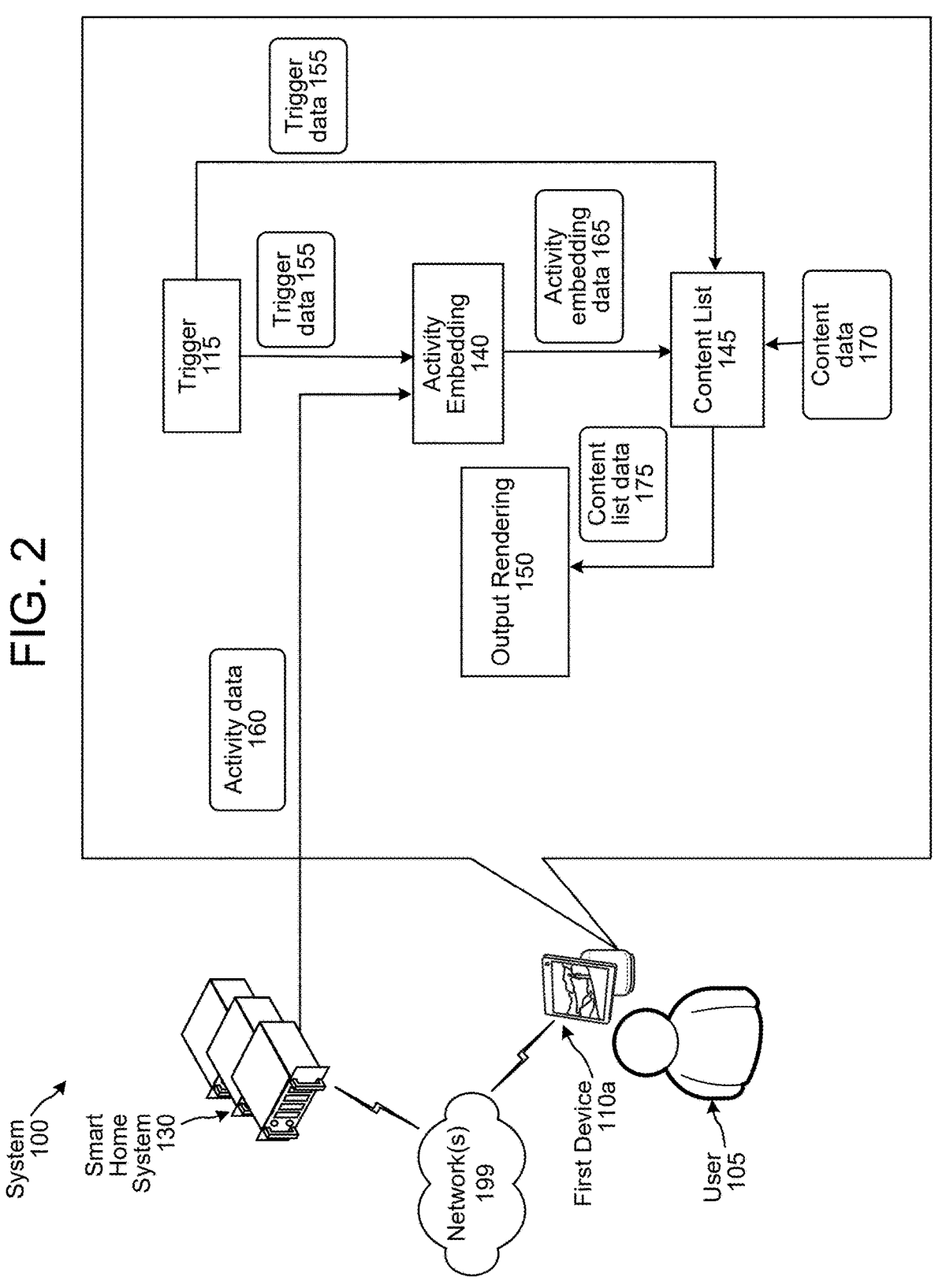
FIG. 2 is a conceptual diagram illustrating another example configuration of the system for generating and presenting a list of content, according to embodiments of the present disclosure.

FIG. 2 illustrates another example configuration of the system 100 for generating and presenting a list of content. In the example of FIG. 2, the list of content may be generated by the first device 110*a* and may be generated based on device state alone, and irrespective of the identity of the particular user 105 presently interacting with the first device 110*a*.

With reference to FIG. 2, the first device 110*a* may include the one or more trigger components (collectively illustrated as the trigger component 115), the activity embedding component 140, the content list component 145, and the output rendering component 150.

In response to determining the trigger event has occurred, the trigger component 115 may send the trigger data 155 to the activity embedding component 140. In response to the trigger component 115 outputting the trigger data 155, the first device 110*a* may query the smart home system 130 for the activity data 160 associated with the first device 110*a* (as described above). For example, the query, sent from the first device 110*a* to the smart home system 130, may include an identifier of the first device 110*a*.

After receiving the activity data 160, the first device 110*a* may send the activity data 160 to the activity embedding component 140, which may process as described above to generate activity embedding data 165.

The activity embedding component 140 may send the activity embedding data 165 to the content list component 145. Additionally, the content list component 145 may receive content data 170. The content list component 145 may process as described above to generate the content list data 175, which may be input to the output rendering component 150. The output rendering component 150 may process as described above to present content to the user (and optionally perform one or more actions without receiving a request from the user 105 to perform said one or more actions).

Figure 3:
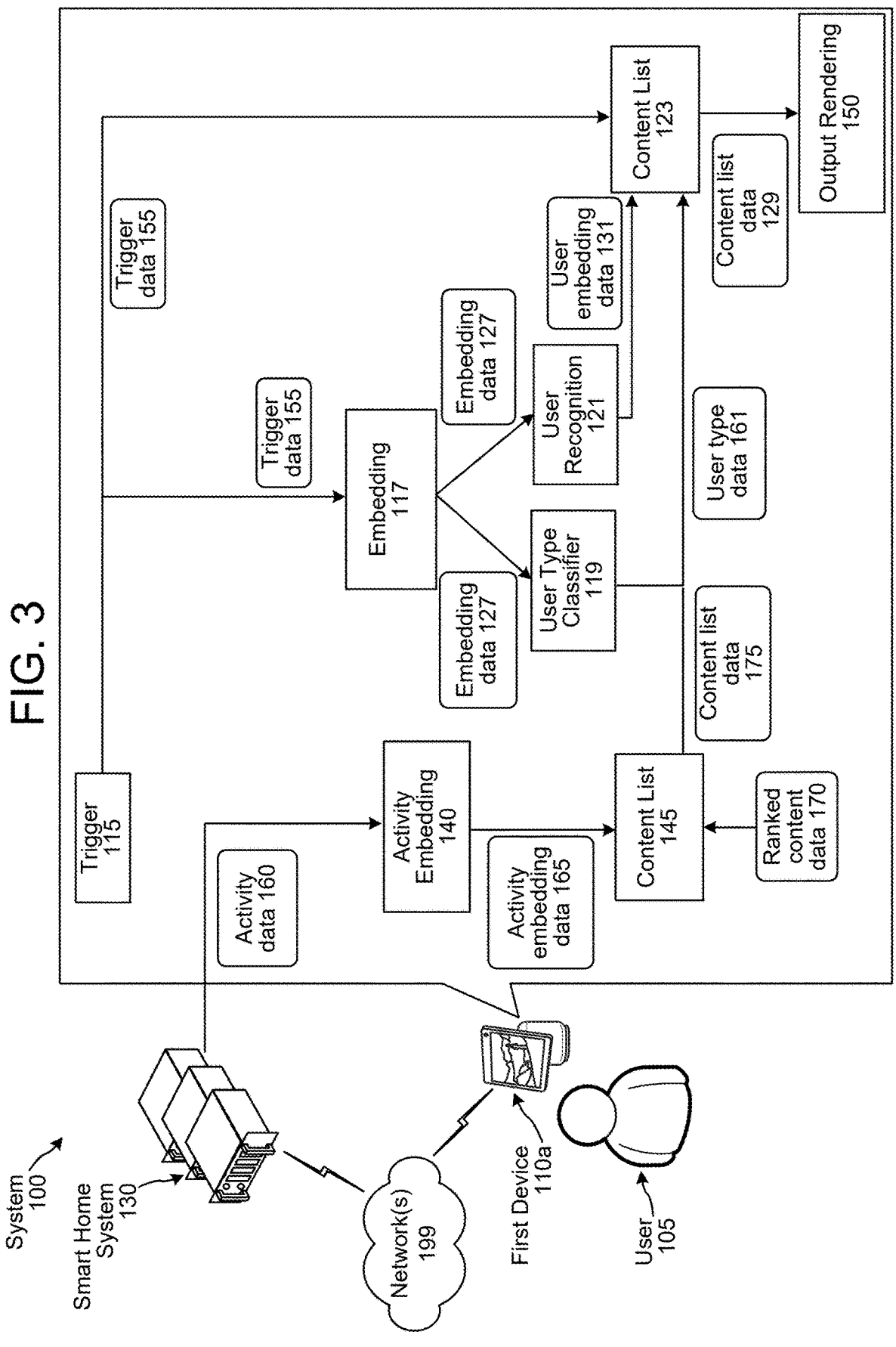
FIG. 3 is a conceptual diagram illustrating another example configuration of the system for generating and presenting a list of content, according to embodiments of the present disclosure.

FIG. 3 illustrates another example of the system 100 for generating and presenting a list of content. As illustrated in FIG. 3, the first device 110*a* may include the trigger component(s) 115, the activity embedding component 140, the content list component 145, the embedding component 117, the user type classifier 119, the user recognition component 121, the content list component 123, and the output rendering component 150, all of which may process as described herein above with respect to FIGS. 1A through 2.

Figure 4:
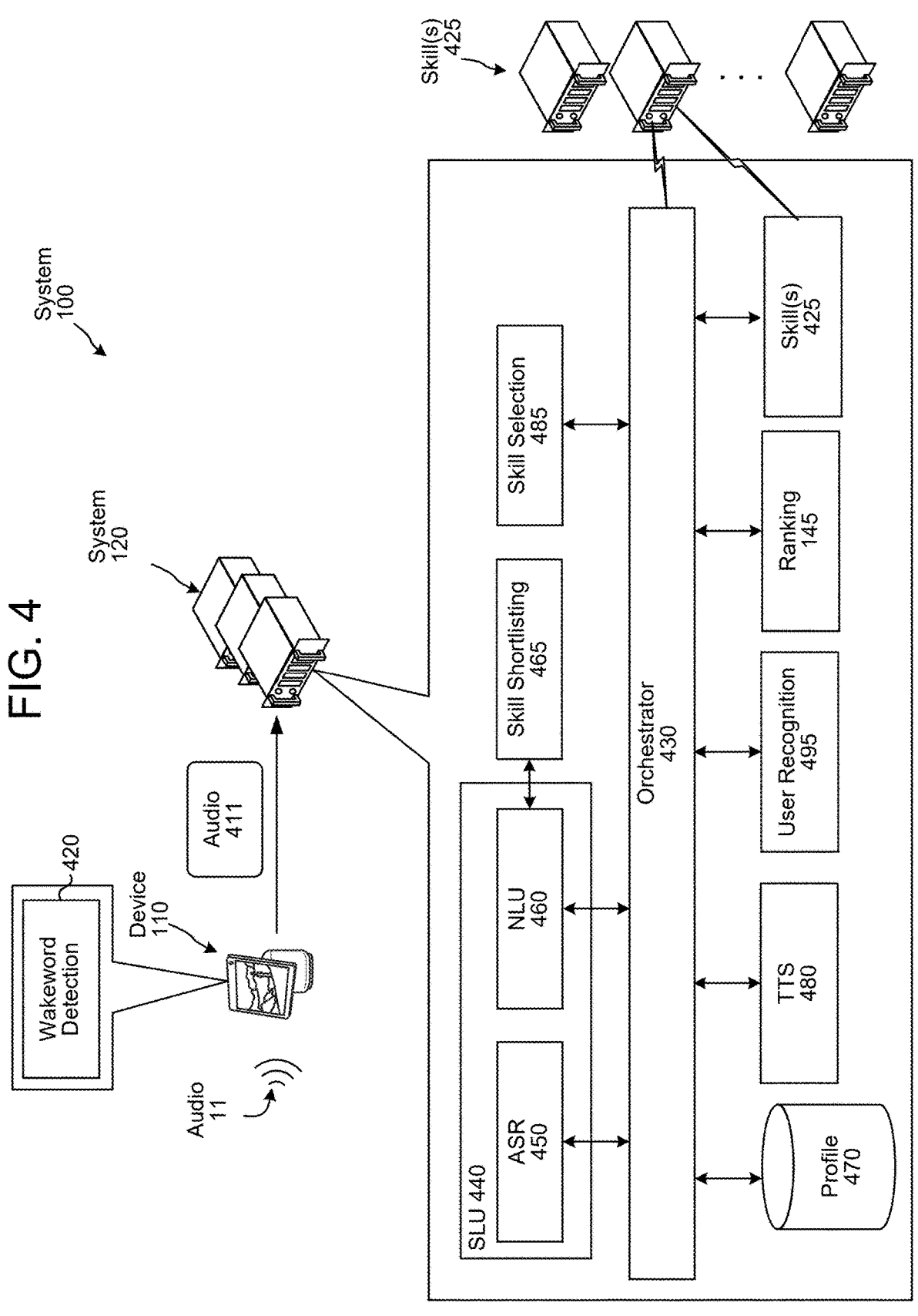
FIG. 4 is a conceptual diagram illustrating example system components that may be used to process a user input, according to embodiments of the present disclosure.

Referring now to FIG. 4, the following describes example components, of a system 120 that may be used to process a user input. The user 105 may speak an input, and the first device 110*a* may receive audio 11 representing the spoken user input. For example, the user 105 may say "Alexa, what is the weather" or "Alexa, book me a plane ticket to Seattle." In other examples, the user 105 may provide another type of input (e.g., selection of a button, selection of one or more displayed graphical interface elements, perform a gesture, etc.). The first device 110*a* may send input data to the system 120 for processing. In examples where the user input is a spoken user input, the input data may be audio data 411. In other examples, the input data may be text data, or image data.

In the example of a spoken user input, a microphone or array of microphones (of or otherwise associated with the first device 110*a*) may continuously capture the audio 11, and the first device 110*a* may continually process audio data, representing the audio 11, as it is continuously captured, to determine whether speech is detected. The first device 110*a* may use various techniques to determine whether audio data includes speech. In some examples, the first device 110*a* may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the first device 110*a* may implement a classifier configured to distinguish speech from background noise. The classifier may be implemented by techniques such as linear classifiers, support vector machines, and decision trees. In still other examples, the first device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 11, the first device 110*a* may determine if the speech is directed at the first device 110*a*. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the first device 110*a* may "wake" and send, to the system 120, the input audio data 411 representing the spoken user input.

The system 120 may include an orchestrator component 430 configured to, among other things, coordinate data transmissions between components of the system 120. The orchestrator component 430 may receive the audio data 411 from the first device 110*a*, and send the audio data 411 to an ASR component 450.

The ASR component 450 transcribes the audio data 411 into ASR output data including one or more ASR hypotheses. An ASR hypothesis may be configured as a textual interpretation of the speech in the audio data 411, or may be configured in another manner, such as one or more tokens. Each ASR hypothesis may represent a different likely interpretation of the speech in the audio data 411. Each ASR hypothesis may be associated with a score (e.g., confidence score, probability score, or the like) representing the associated ASR hypothesis correctly represents the speech in the audio data 411.

The ASR component 450 interprets the speech in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the speech represented in the audio data 411.

In at least some instances, instead of the first device 110*a* receiving a spoken natural language input, the first device 110*a* may receive a textual (e.g., typed) natural language input. The first device 110*a* may determine text data representing the textual natural language input, and may send the text data to the system 120, wherein the text data is received by the orchestrator component 430. The orchestrator component 430 may send the text data or ASR output data, depending on the type of natural language input received, to a NLU component 460.

The NLU component 460 processes the ASR output data or text data to determine one or more NLU hypotheses embodied in NLU output data. The NLU component 460 may perform intent classification (IC) processing on the ASR output data or text data to determine an intent of the natural language input. An intent corresponds to an action to be performed that is responsive to the natural language input. To perform IC processing, the NLU component 460 may communicate with a database of words linked to intents. For example, a music intent database may link words and phrases such as "quiet," "volume off," and "mute" to a <Mute> intent. The NLU component 460 identifies intents by comparing words and phrases in ASR output data or text data to the words and phrases in an intents database. In some embodiments, the NLU component 460 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 460 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 460 may be linked to one or more grammar frameworks with entity types to be populated with entity values. Each entity type of a grammar framework corresponds to a portion of ASR output data or text data that the NLU component 460 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 460 may perform NER processing to identify words in ASR output data or text data as subject, object, verb, preposition, etc. based on grammar rules and/or models. Then, the NLU component 460 may perform IC processing using the identified verb to identify an intent. Thereafter, the NLU component 460 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 460 may generate NLU output data including one or more NLU hypotheses, with each NLU hypothesis including an intent and optionally one or more entity types and corresponding entity values. In some embodiments, the NLU component 460 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

The skill shortlisting component 465 is configured to determine a subset of skill components, implemented by or in communication with the system 120, that may perform an action responsive to the (spoken) user input. Without the skill shortlisting component 465, the NLU component 460 may process ASR output data input thereto with respect to every skill component of or in communication with the system 120. By implementing the skill shortlisting component 465, the NLU component 460 may process ASR output data with respect to only the skill components the skill shortlisting component 465 determines are likely to execute with respect to the user input. This reduces total compute power and latency attributed to NLU processing.

The skill shortlisting component 465 may include one or more ML models. The ML model(s) may be trained to recognize various forms of user inputs that may be received by the system 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The system 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 465, may be trained with respect to a different skill component. Alternatively, the skill shortlisting component 465 may implement one ML model per domain, such as one ML model for skill components associated with a weather domain, one ML model for skill components associated with a ride sharing domain, etc.

The sample user inputs provided by a skill component developer, and potentially related sample user inputs determined by the system 120, may be used as binary examples to train a ML model associated with a skill component. For example, some sample user inputs may be positive examples (e.g., user inputs that may be used to invoke the skill component). Other sample user inputs may be negative examples (e.g., user inputs that may not be used to invoke the skill component).

As described above, the skill shortlisting component 465 may include a different ML model for each skill component, a different ML model for each domain, or some other combination of ML models. In some embodiments, the skill shortlisting component 465 may alternatively include a single ML model. This ML model may include a portion trained with respect to characteristics (e.g., semantic characteristics) shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 465 may make binary (e.g., yes or no) determinations regarding which skill components relate to the ASR output data. The skill shortlisting component 465 may make such determinations using the one or more ML models described herein above. If the skill shortlisting component 465 implements a different ML model for each skill component, the skill shortlisting component 465 may run the ML models that are associated with enabled skill components as indicated in a user profile associated with the first device 110a and/or the user 105.

The skill shortlisting component 465 may generate an n-best list of skill components that may execute with respect to the user input represented in the ASR output data. The size of the n-best list of skill components is configurable. In an example, the n-best list of skill components may indicate every skill component of, or in communication with, the system 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 465 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 465 may output a different n-best list of skill components for each ASR hypothesis. Alternatively, the skill shortlisting component 465 may output a single n-best list of skill components representing the skill components that are related to the multiple ASR hypotheses represented in the ASR output data.

As indicated above, the skill shortlisting component 465 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component 450. Additionally or alternatively, the n-best list of skill components may include no more than a threshold number of entries for each ASR hypothesis (e.g., no more than five entries for a first ASR hypothesis, no more than five entries for a second ASR hypothesis, etc.).

Additionally or alternatively to making a binary determination regarding whether a skill component potentially relates to the ASR output data, the skill shortlisting component 465 may generate confidence scores representing likelihoods that skill components relate to the ASR output data. The skill shortlisting component 465 may perform matrix vector modification to obtain confidence scores for all skill components in a single instance of processing of the ASR output data.

An n-best list of skill components including confidence scores that may be output by the skill shortlisting component 465 may be represented as, for example:

Story skill component, 0.67
Recipe skill component, 0.62
Information skill component, 0.57
Shopping skill component, 0.42

As indicated, the confidence scores output by the skill shortlisting component 465 may be numeric values. The confidence scores output by the skill shortlisting component 465 may alternatively be binned values (e.g., high, medium, low).

The n-best list of skill components may only include entries for skill components having a confidence score satisfying (e.g., meeting or exceeding) a minimum threshold confidence score. Alternatively, the skill shortlisting component 465 may include entries for all skill components associated with enabled skill components of the current user, even if one or more of the skill components are associated with confidence scores that do not satisfy the minimum threshold confidence score.

The skill shortlisting component 465 may consider other data when determining which skill components may relate to the user input represented in the ASR output data as well as respective confidence scores. The other data may include usage history data, data indicating the skill components that are enabled with respect to the first device 110a and/or user 105, data indicating a device type of the first device 110a, data indicating a speed of the first device 110a, a location of the first device 110a, data indicating a skill component that was being used to output content via the first device 110a when the first device 110a received the instant user input, etc.

The thresholding implemented with respect to the n-best list of skill components generated by the skill shortlisting component 465 as well as the different types of other data considered by the skill shortlisting component 465 are configurable.

As described above, the system 120 may perform speech processing using two different components (e.g., the ASR component 450 and the NLU component 460). In at least some embodiments, the system 120 may implement a spoken language understanding (SLU) component 440 configured to process audio data 411 to determine NLU output data.

The SLU component 440 may be equivalent to a combination of the ASR component 450 and the NLU component 460. Yet, the SLU component 440 may process audio data 411 and directly determine the NLU output data, without an intermediate step of generating ASR output data. As such, the SLU component 440 may take audio data 411 representing a spoken natural language input and attempt to make a semantic interpretation of the spoken natural language input. That is, the SLU component 440 may determine a meaning associated with the spoken natural language input and then implement that meaning. For example, the SLU component 440 may interpret audio data 411 representing a spoken natural language input in order to derive a desired action. The SLU component 440 may output a most likely NLU hypothesis, or multiple NLU hypotheses associated with respective confidence or other scores (such as probability scores, etc.).

The system 120 may include a gesture detection component (not illustrated in FIG. 4). The system 120 may receive image data representing a gesture, and the gesture detection component may process the image data to determine a gesture represented therein. The gesture detection component may implement art-/industry-known gesture detection processes.

In embodiments where the system 120 receives non-image data (e.g., text data) representing a gesture, the orchestrator component 430 may be configured to determine what downstream processing is to be performed in response to the gesture.

The system may include a skill selection component 485 is configured to determine a skill component, or n-best list of skill components each associated with a confidence score/value, to execute to respond to the user input. The skill selection component 485 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the first device 110*a* to output content (e.g., music, video, synthesized speech, etc.) when the first device 110*a* captured the user input, one or more skill components that are indicated as enabled in a profile (as stored in the profile storage 470) associated with the user 105, output capabilities of the first device 110*a*, a geographic location of the first device 110*a*, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule (e.g., each rule corresponding to a different intent capable of being handled by the skill component). In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components (e.g., only skill components indicated as enabled in the user profile of the user 105).

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of responding to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 485. For example, such other data may indicate capabilities (e.g., output capabilities or components such as a connected screen, loudspeaker, etc.) of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator (e.g., flag, representing a strength of the skill component's ability to personalize its response to the user input).

In some embodiments, a skill component's pre-response may be configured to a pre-defined schema. By requiring pre-responses to conform to a specific schema (e.g., by requiring skill components to only be able to provide certain types of data in pre-responses), new skill components may be onboarded into the skill component selection functionality without needing to reconfigure the skill selection component 485 each time a new skill component is onboarded. Moreover, requiring pre-responses to conform to a schema limits the amount of values needed to be used to train and implement a ML model for ranking skill components.

In some embodiments, a skill component's pre-response may indicate whether the skill component requests exclusive display access (i.e., whether the skill component requests its visual data be presented on an entirety of the display).

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105 (e.g., as represented in a user profile or group profile stored in the profile storage 470), NLU confidence scores of the NLU output data, a device type of the first device 110a, data indicating whether the first device 110a was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition (e.g., a threshold NLU confidence score) that the skill component was outputting content via the first device 110a when the first device 110a received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition (e.g., a threshold NLU confidence score, etc.).

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The system 120 may include or otherwise communicate with one or more skill components 425. A skill component 425 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the first device 110a, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill component may operate in conjunction between the first device 110a/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 425 may process to determine output data responsive to the spoken user input (e.g., based on the intent and entity data as represented in the NLU output data received by the skill component 425).

The system 120 may include a TTS component 480 that generates audio data including synthesized speech. The TTS component 480 is configured to generate output audio data including synthesized speech. The TTS component 480 may perform speech synthesis using one or more different methods. In one method of synthesis called unit selection, the TTS component 480 matches a database of recorded speech against the data input to the TTS component 480. The TTS component 480 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 480 may match units to the input data to create a natural sounding waveform. The unit database may include multiple examples of phonetic units to provide the TTS component 480 with many different options for concatenating units into speech. One benefit of unit selection is that, depending on the size of the database, a natural sounding speech output may be generated. The larger the unit database, the more likely the TTS component 480 will be able to construct natural sounding speech.

Unit selection speech synthesis may be performed as follows. Unit selection includes a two-step process. First the TTS component 480 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the TTS component 480. As part of unit selection, the unit selection engine 188 chooses the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 480 to create an artificial speech waveform output. Parametric synthesis may use an acoustic model and various statistical techniques to match data, input to the TTS component 480, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 480 may include an acoustic model, or other models, which may convert data, input to the TTS component 480, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 480 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (i.e., a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 480, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 480 may also calculate potential states for other potential audio outputs, such as various ways of pronouncing phoneme /E/, as potential acoustic matches for the phonetic unit. In this manner multiple states and state transition probabilities may be calculated.

The probable states and probable state transitions calculated by the TTS component 480 may lead to a number of potential audio output sequences. Based on the acoustic model and other potential models, the potential audio output sequences may be scored according to a confidence level of the TTS component 480. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The system 120 may include a user recognition component 495. The user recognition component 495 may recognize one or more users using various data. The user recognition component 495 may take as input the audio data 411. The user recognition component 495 may perform user recognition by comparing speech characteristics, in the audio data 411, to stored speech characteristics of users. The user recognition component 495 may additionally or alternatively perform user recognition by comparing biometric data (e.g., fingerprint data, iris data, retina data, etc.), received by the system 120 in correlation with a natural language input, to stored biometric data of users. The user recognition component 495 may additionally or alternatively perform user recognition by comparing image data (e.g., including a representation of at least a feature of a user), received by the system 120 in correlation with a natural language input, with stored image data including representations of features of different users. The user recognition component 495 may perform other or additional user recognition processes, including those known in the art. For a particular natural language input, the user recognition component 495 may perform processing with respect to stored data of users associated with the first device 110*a* that received the natural language input.

The user recognition component 495 determines whether a natural language input originated from a particular user. For example, the user recognition component 495 may determine a first value representing a likelihood that a natural language input originated from a first user, a second value representing a likelihood that the natural language input originated from a second user, etc. The user recognition component 495 may also determine an overall confidence regarding the accuracy of user recognition processing.

The user recognition component 495 may output a single user identifier corresponding to the most likely user that originated the natural language input. Alternatively, the user recognition component 495 may output multiple user identifiers (e.g., in the form of an N-best list) with respective values representing likelihoods of respective users originating the natural language input. The output of the user recognition component 495 may be used to inform NLU processing, processing performed by a skill component 425, as well as processing performed by other components of the system 120 and/or other systems.

The system 120 may include profile storage 470. The profile storage 470 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 470 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 470 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 5:
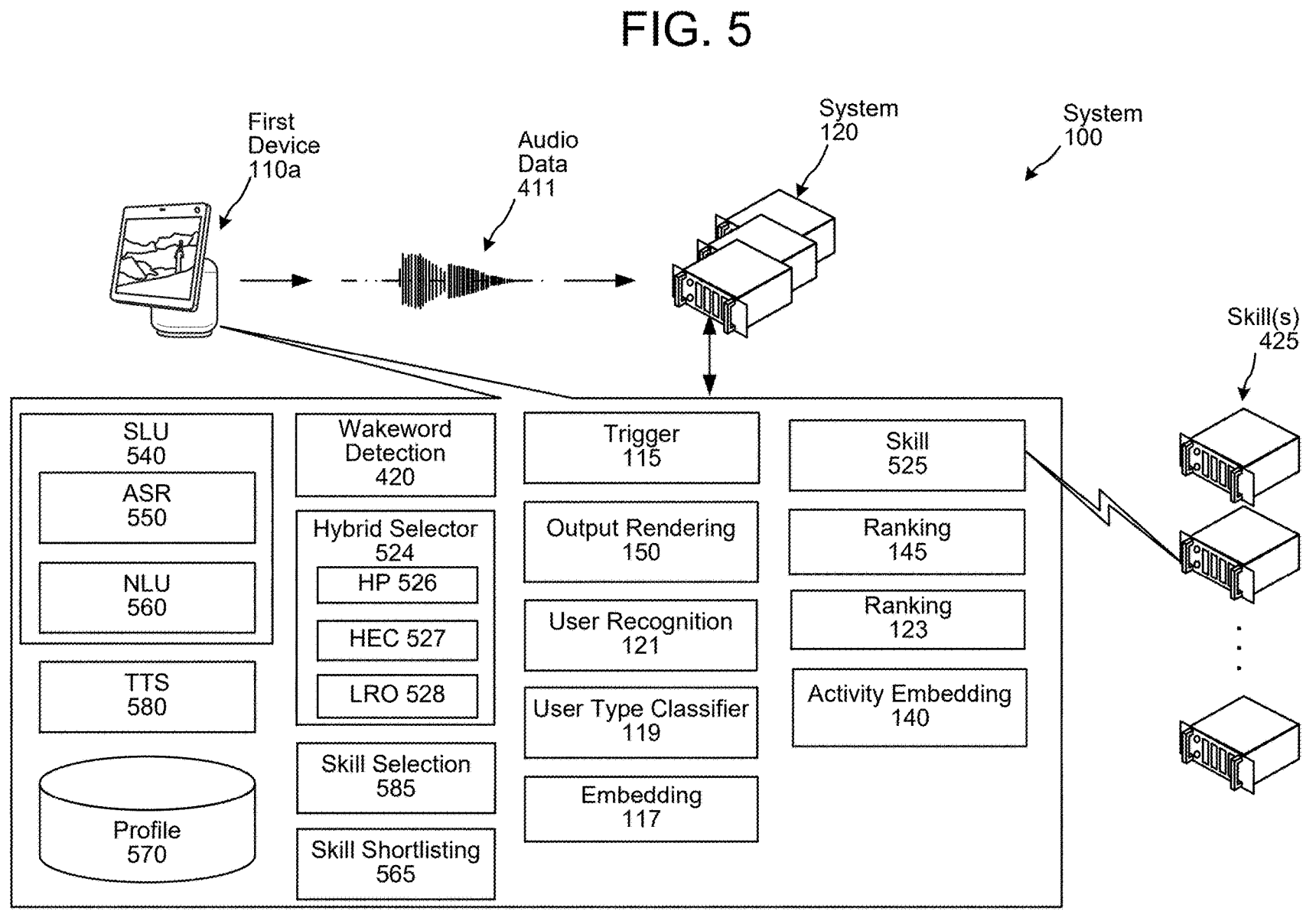

The foregoing describes illustrative components and processing of the system 120. The following describes illustrative components and processing of the first device 110a. As illustrated in FIG. 5, in at least some embodiments the system 120 may receive the audio data 411 from the first device 110a, to recognize speech in the received audio data 411, and to perform functions in response to the recognized speech. In at least some embodiments, these functions involve sending directives (e.g., commands), from the system 120 to the first device 110a to cause the first device 110a to perform an action, such as output synthesized speech (responsive to the spoken user input) via a loudspeaker(s), and/or control one or more secondary devices by sending control commands to the one or more secondary devices.

Thus, when the first device 110a is able to communicate with the system 120 over the network(s) 199, some or all of the functions capable of being performed by the system 120 may be performed by sending one or more directives over the network(s) 199 to the first device 110a, which, in turn, may process the directive(s) and perform one or more corresponding actions. For example, the system 120, using a remote directive that is included in response data (e.g., a remote response), may instruct the first device 110a to output synthesized speech via a loudspeaker(s) of (or otherwise associated with) the first device 110a, to output content (e.g., music) via the loudspeaker(s) of (or otherwise associated with) the first device 110a, to display content on a display of (or otherwise associated with) the first device 110a, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted previously, the first device 110a may include a wakeword detection component 420 configured to detect a wakeword (e.g., "Alexa") that indicates to the first device 110a that the audio data 411 is to be processed for determining NLU output data. In at least some embodiments, a hybrid selector 524, of the first device 110a, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system 120 and/or an ASR component 550 implemented by the first device 110a. The wakeword detection component 420 may also send an indication, to the hybrid selector 524, representing a wakeword was not detected. In response to receiving such an indication, the hybrid selector 524 may refrain from sending the audio data 411 to the system 120, and may prevent the ASR component 550 from processing the audio data 411. In this situation, the audio data 411 can be discarded.

The first device 110a may conduct its own speech processing using on-device language processing components (such as a SLU component 540, the ASR component 550, and/or a NLU component 560) similar to the manner discussed above with respect to the system-implemented SLU component 440, ASR component 450, and NLU component 460. The first device 110a may also internally include, or otherwise have access to, other components such as one or more skills 525 (configured to process in a similar manner to the one or more skills components 425 implemented by and/or in communication with the system 120), a profile storage 570 (configured to store similar profile data to the profile storage 470 implemented by the system 120), a TTS component 580 (configured to process in a similar manner to the TTS component 480 implemented by the system 120), a skill selection component 585 (configured to process in a similar manner to the skill selection component 485 implemented by the system 120), a skill shortlisting component 565 (configured to process in a similar manner to the skill shortlisting component 465 implemented by the system 120), the trigger component 115, the output rendering component 150, the user recognition component 121, the user type classifier 119, the embedding component 117, the content list component 145, the content list component 123 the activity embedding component 140, and/or other components. In at least some embodiments, the profile storage 570 may only store profile data for a user or group of users specifically associated with the first device 110a.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the first device 110a attempts to process a user input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 524, of the first device 110a, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 411 to pass to the system 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of the audio data 411, and to otherwise initiate the operations of on-device language processing when the audio data 411 becomes available. In general, the hybrid selector 524 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the first device 110a receives directive data from the system 120 and chooses to use that remotely-determined directive data.

Thus, when the audio data 411 is received, the HP 526 may allow the audio data 411 to pass through to the system 120 and the HP 526 may also input the audio data 411 to the ASR component 550 by routing the audio data 411 through the HEC 527 of the hybrid selector 524, whereby the LRO 528 notifies the ASR component 550 of the audio data 411. At this point, the hybrid selector 524 may wait for response data from either or both the system 120 and/or the on-device language processing components. However, the disclosure is not limited thereto, and in some examples the hybrid selector 524 may send the audio data 411 only to the ASR component 550 without departing from the disclosure. For example, the first device 110a may process the audio data 411 on-device without sending the audio data 411 to the system 120.

The ASR component 550 is configured to receive the audio data 411 from the hybrid selector 524, and to recognize speech in the audio data 411, and the NLU component 560 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 560) may be selected as usable to respond to a user input, and local response data may be sent to the hybrid selector 524, such as a "ReadyToExecute" response. The hybrid selector 524 may then determine whether to use directive data from the on-device components to respond to the user input, to use directive data received from the system 120, assuming a remote response is even received (e.g., when the first device 110a is able to access the system 120 over the network(s) 199), or to determine output data requesting additional information from the user 105.

The first device 110a and/or the system 120 may associate a unique identifier with each user input. The first device 110a may include the unique identifier when sending the audio data 411 to the system 120, and the response data from the system 120 may include the unique identifier to identify to which user input the response data corresponds.

In at least some embodiments, the first device 110a may include one or more skills 590 that may process similarly to the system-implemented skill(s) 190. The skill(s) 590 installed on (or in communication with) the first device 110a may include, without limitation, a smart home skill and/or a device control skill configured to control a second device(s), a music skill configured to output music, a navigation skill configured to output directions, a shopping skill configured to conduct an electronic purchase, and/or the like.

Figure 6:
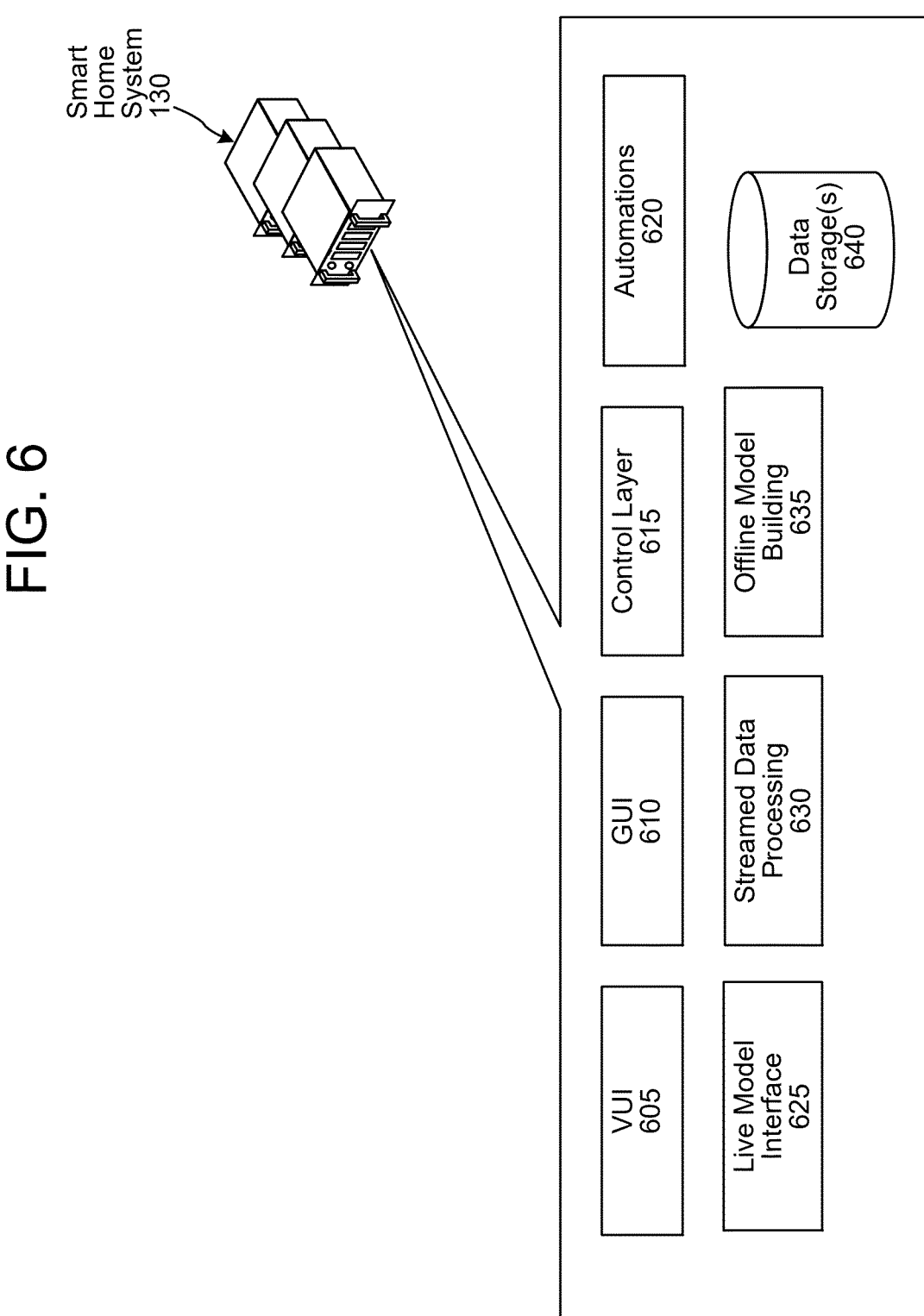
FIG. 6 is a block diagram conceptually illustrating example components of a smart home system, according to embodiments of the present disclosure.

FIG. 6 is a conceptual diagram of components of the smart home system 130 in addition to those described above. The smart home system 130 may include 666666666666a voice user interface (VUI) component 605, a graphical user interface (GUI) component 610, a control layer 615, an automations component 620, a live model interface 625, a streamed data processing component 630, an offline model building component 635, and one or more data storages 640.

The VUI component 605 may include a smart home skill configured to process with respect to NLU output data corresponding to a home automation domain. The VUI component 605 may further include a component configured to handle ambiguous target resolution for home automation domain comments. This component may generate one or more questions for resolving an ambiguous entity reference in a spoken user input. For example, for the spoken user input "turn on couch", this component may generate the question "did you mean the sofa light?". The VUI component 605 may include a recovery arbitration and friction feedback learning engine configured to arbitrate between misrouted smart home domain intents and, for example, music domain intents. The VUI component 605 may include a skill configured to handle group management (e.g., create/update membership/delete) and device rename intents. This skill may also attempt to recover user friction device turn on/off intents.

The GUI component 610 may include one or more front end services configured to interact with one or more APIs of an application implemented on a smart phone, tablet, or the like. The GUI component 610 may include a notification service configured to, for example, generate smart phone push notifications if a lock is left unlocked for longer than a threshold amount of time. The GUI component 610 may include a recommended routines engine service configured to use a template mechanism to build routine recommendations to be displayed (e.g., in an application installed on a smart phone, tablet, or the like). The GUI component 610 may include a favorites component configured to provide device lists to be show in a "favorites" section of an application installed on a smart phone, tablet, or the like. The favorites component may also be configured to handle device starter set generation (e.g., call a ML model to determine which devices to show if no custom favorites are defined yet).

The control layer 615 may include an Internet of Things service configured to handle control and state retrieval of smart home devices. The control layer 615 may include a device state store service, which may be a cache of last known state of smart home devices. The control layer 615 may include a user home registry service configured to manage a database of all smart home devices and metadata, such as names, aliases, control routes, appliance types, etc. The control layer 615 may include a device metadata service configured to manage device metadata, such as language and location settings. The control layer 615 may include one or more settings tables, such as a permission and access control table and a favorites table. The control layer may include a device access API usable to provided record of current home configuration. The control layer may include a universal settings service configured to control various settings, such as change language, opt-in settings, etc.

The automations component 620 may include a triggers and sequences component configured to handle routines and other time- or event-triggered actions, such as sleep timers. The automations component 620 may include an arbitration component configured to perform automatic actions (e.g., turning off lights when a user is asleep). The automations component 620 may include a lighting timer service configured to turn lights on and off to present someone is home, as well as being configured to dim lights.

The live model interface 625 may include a targeting/entity resolution component that implements one or more targeting language models that rank entries as targets for home automation voice comments. The live model interface 625 may include a smart home machine learning model service configured to predict anomalies to send as VUI recommendations and/or mobile push recommendations. The live model interface may include a home state prediction component configured to implement an embedding-based model to predict expected home state. The live model interface 625 may include one or more models configured to filter recommendations based on past recommendation responses. The live model interface 625 may include a model endpoint to rank devices to be displayed as favorites for users who have not customized their favorite devices yet.

The streamed data processing component 630 may include a data ingestion service configured to ingest various data from various sources, store the data, and output said data for streamed and offline model processing. The streamed data processing component 630 may include an Internet of Things data warehouse that generates streams of data and performed periodic (e.g., weekly) dumps of data ingested by the data ingestion service. The streamed data processing component 630 may include a signal compute service configured to stream and join different data streams. The streamed data processing component 630 may include a raw activity service configured to compute user activity, such as "all users sleeping" or "someone active in the house. The output of the raw activity service may be used for automatic actions, such as turning off lights when everyone is sleeping. The streamed data processing component 630 may include a smart home automatized activity modeling service configured to compute activity transitions and send change events to subscribers. The streamed data processing component 630 may include a feedback computation service configured to perform feedback computation using sessionized data aggregated across time windows from multiple sources.

The offline model building component 635 may include a secure compute component configured to limit data egress and allow experimentation and computation on sensitive data. The offline model building component 635 may include a scheduler service configured to schedule and run metrics or model update jobs. The offline model building component 635 may include a recommendations metrics job component configured to perform periodic (e.g., daily) recommendations metrics computations and response metrics. The offline model building component 635 may include periodic (e.g., daily) model update components configured to run streamed personalized feature updates. The offline model building component 635 may include a component configured to compute target inference priors (e.g., which devices are typically controlled at which time); a component configured to compute recommendation candidate lists, priors, and device embeddings; a component configured to compute embeddings and device features for favorites and personalized recommended routines; and/or a component configured to compute priors for typical activity by local time of day to be used in activity prediction.

The data storage(s) 640 may include a storage of service data that is consumed by machine learning pipelines to compute metrics, train models, and update per-user features. The data storage(s) 640 may include a segmented offline storage including hidden state data on a per-user level for periodic (e.g., daily) model updaters. The data storage(s) 640 may include one or more database tables for storing per-user and per-device features computed by offline job, to be used in live model inference. The data storage(s) 640 may include a self-service dataset generator that filters, transforms, and joins stream of data into batch-processing-friendly datasets.

Figure 7:
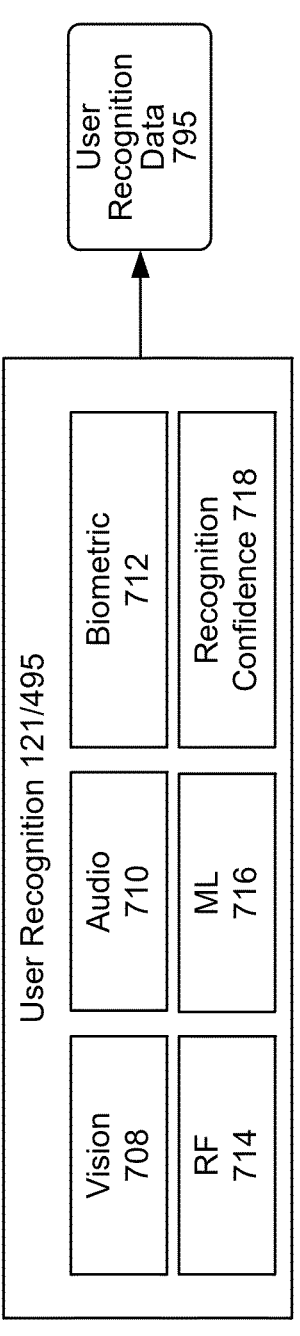
FIG. 7 is a schematic diagram of an illustrative architecture in which sensor data is combined to recognize one or more users, according to embodiments of the present disclosure.

The first device 110*a* and/or the system(s) 120 may include the user recognition component 121/495 that recognizes one or more users using a variety of data. As illustrated in FIG. 7, the user recognition component 121/495 may include one or more subcomponents including a vision component 708, an audio component 710, a biometric component 712, a radio frequency (RF) component 714, a machine learning (ML) component 716, and a recognition confidence component 718. In some instances, the user recognition component 121/495 may monitor data and determinations from one or more subcomponents to determine an identity of one or more users associated with data input to the first device 110*a* and/or the system(s) 120. The user recognition component 121/495 may output user recognition data 795, which may include a user identifier associated with a user the user recognition component 121/495 determines originated data input to the first device 110*a* and/or the system(s) 120. The user recognition data 121/795 may be used to inform processes performed by various components of the first device 110*a* and/or the system(s) 120.

The vision component 708 may receive data from one or more sensors capable of providing images (e.g., cameras) or sensors indicating motion (e.g., motion sensors). The vision component 708 can perform facial recognition or image analysis to determine an identity of a user and to associate that identity with a user profile associated with the user. In some instances, when a user is facing a camera, the vision component 708 may perform facial recognition and identify the user with a high degree of confidence. In other instances, the vision component 708 may have a low degree of confidence of an identity of a user, and the user recognition component 121/495 may utilize determinations from additional components to determine an identity of a user. The vision component 708 can be used in conjunction with other components to determine an identity of a user. For example, the user recognition component 121/495 may use data from the vision component 708 with data from the audio component 710 to identify what user's face appears to be speaking at the same time audio is captured by a first device 110*a* the user is facing for purposes of identifying a user who spoke an input to the first device 110*a* and/or the system(s) 120.

The overall system of the present disclosure may include biometric sensors that transmit data to the biometric component 712. For example, the biometric component 712 may receive data corresponding to fingerprints, iris or retina scans, thermal scans, weights of users, a size of a user, pressure (e.g., within floor sensors), etc., and may determine a biometric profile corresponding to a user. The biometric component 712 may distinguish between a user and sound from a television, for example. Thus, the biometric component 712 may incorporate biometric information into a confidence level for determining an identity of a user. Biometric information output by the biometric component 712 can be associated with specific user profile data such that the biometric information uniquely identifies a user profile of a user.

The radio frequency (RF) component 714 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 714 the strength of the signal (e.g., as a received signal strength indication (RSSI)). The RF component 714 may use the RSSI to determine an identity of a user (with an associated confidence level). In some instances, the RF component 714 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the first device 110*a*. In this manner, the user may "register" with the system 100 for purposes of the system 100 determining who spoke a particular input. Such a registration may occur prior to, during, or after speaking of an input.

The ML component 716 may track the behavior of various users as a factor in determining a confidence level of the identity of the user. By way of example, a user may adhere to a regular schedule such that the user is at a first location during the day (e.g., at work or at school). In this example, the ML component 716 would factor in past behavior and/or trends in determining the identity of the user that provided input to the first device 110*a* and/or the system(s) 120. Thus, the ML component 716 may use historical data and/or usage patterns over time to increase or decrease a confidence level of an identity of a user.

In at least some instances, the recognition confidence component 718 receives determinations from the various components 708, 710, 712, 714, and 716, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 795.

The audio component 710 may receive data from one or more sensors capable of providing an audio signal (e.g., one or more microphones) to facilitate recognition of a user. The audio component 710 may perform audio recognition on an audio signal to determine an identity of the user and associated user identifier. In some instances, aspects of first device 110*a* and/or the system(s) 120 may be configured at a computing device (e.g., a local server). Thus, in some instances, the audio component 710 operating on a computing device may analyze all sound to facilitate recognition of a user. In some instances, the audio component 710 may perform voice recognition to determine an identity of a user.

The audio component 710 may also perform user identification based on audio data 411 input into the first device 110*a* and/or the system(s) 120 for speech processing. The audio component 710 may determine scores indicating whether speech in the audio data 411 originated from particular users. For example, a first score may indicate a likelihood that speech in the audio data 411 originated from a first user associated with a first user identifier, a second score may indicate a likelihood that speech in the audio data 411 originated from a second user associated with a second user identifier, etc. The audio component 710 may perform user recognition by comparing speech characteristics represented in the audio data 411 to stored speech characteristics of users (e.g., stored voice profiles associated with the first device 110*a* that captured the spoken user input).

Figure 8:
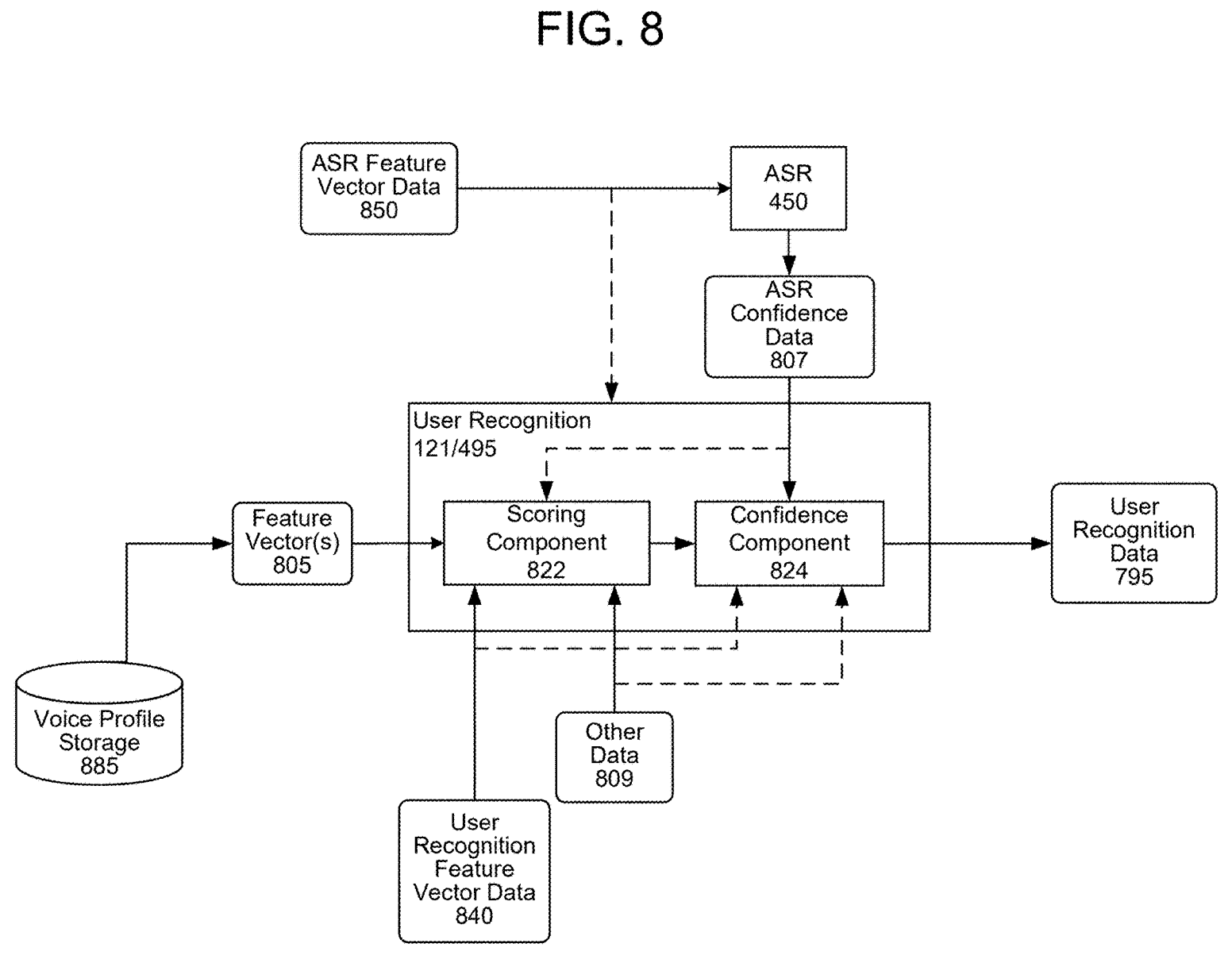

FIG. 8 illustrates user recognition processing as may be performed by the user recognition component 121/495. The ASR component 450 performs ASR processing on ASR feature vector data 850. ASR confidence data 807 may be passed to the user recognition component 121/495.

The user recognition component 121/495 performs user recognition using various data including the user recognition feature vector data 840, feature vectors 805 representing voice profiles of users of the system 100, the ASR confidence data 807, and other data 809. The user recognition component 121/495 may output the user recognition data 795, which reflects a certain confidence that the user input was spoken by one or more particular users. The user recognition data 795 may include one or more user identifiers (e.g., corresponding to one or more voice profiles).

Each user identifier in the user recognition data 795 may be associated with a respective confidence value, representing a likelihood that the user input corresponds to the user identifier. A confidence value may be a numeric or binned value.

The feature vector(s) 805 input to the user recognition component 121/495 may correspond to one or more voice profiles. The user recognition component 121/495 may use the feature vector(s) 805 to compare against the user recognition feature vector 840, representing the present user input, to determine whether the user recognition feature vector 840 corresponds to one or more of the feature vectors 805 of the voice profiles. Each feature vector 805 may be the same size as the user recognition feature vector 840.

To perform user recognition, the user recognition component 121/495 may determine the first device 110*a* from which the audio data 411 originated. For example, the audio data 411 may be associated with metadata including a device identifier representing the first device 110*a*. Either the first device 110*a* or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 840 produced from the audio data 411. The user recognition component 121/495 may send a signal to voice profile storage 885, with the signal requesting only audio data and/or feature vectors 805 (depending on whether audio data and/or corresponding feature vectors are stored) associated with the device identifier, the group profile identifier, and/or the user identifiers represented in the metadata. This limits the universe of possible feature vectors 805 the user recognition component 121/495 considers at runtime and thus decreases the amount of time to perform user recognition processing by decreasing the amount of feature vectors 805 needed to be processed. Alternatively, the user recognition component 121/495 may access all (or some other subset of) the audio data and/or feature vectors 805 available to the user recognition component 121/495. However, accessing all audio data and/or feature vectors 805 will likely increase the amount of time needed to perform user recognition processing based on the magnitude of audio data and/or feature vectors 805 to be processed.

If the user recognition component 121/495 receives audio data from the voice profile storage 885, the user recognition component 121/495 may generate one or more feature vectors 805 corresponding to the received audio data.

The user recognition component 121/495 may attempt to identify the user that spoke the speech represented in the audio data 411 by comparing the user recognition feature vector 840 to the feature vector(s) 805. The user recognition component 121/495 may include a scoring component 822 that determines respective scores indicating whether the user input (represented by the user recognition feature vector 840) was spoken by one or more particular users (represented by the feature vector(s) 805). The user recognition component 121/495 may also include a confidence component 824 that determines an overall accuracy of user recognition processing (such as those of the scoring component 822) and/or an individual confidence value with respect to each user potentially identified by the scoring component 822. The output from the scoring component 822 may include a different confidence value for each received feature vector 805. For example, the output may include a first confidence value for a first feature vector 805*a* (representing a first voice profile), a second confidence value for a second feature vector 805*b* (representing a second voice profile), etc. Although illustrated as two separate components, the scoring component 822 and the confidence component 824 may be combined into a single component or may be separated into more than two components.

The scoring component 822 and the confidence component 824 may implement one or more trained machine learning models (such as neural networks, classifiers, etc.) as known in the art. For example, the scoring component 822 may use probabilistic linear discriminant analysis (PLDA) techniques. PLDA scoring determines how likely it is that the user recognition feature vector 840 corresponds to a particular feature vector 805. The PLDA scoring may generate a confidence value for each feature vector 805 considered and may output a list of confidence values associated with respective user identifiers. The scoring component 822 may also use other techniques, such as GMMs, generative Bayesian models, or the like, to determine confidence values.

The confidence component 824 may input various data including information about the ASR confidence 807, speech length (e.g., number of frames or other measured length of the user input), audio condition/quality data (such as signal-to-interference data or other metric data), fingerprint data, image data, or other factors to consider how confident the user recognition component 121/495 is with regard to the confidence values linking users to the user input. The confidence component 824 may also consider the confidence values and associated identifiers output by the scoring component 822. For example, the confidence component 824 may determine that a lower ASR confidence 807, or poor audio quality, or other factors, may result in a lower confidence of the user recognition component 121/495. Whereas a higher ASR confidence 807, or better audio quality, or other factors, may result in a higher confidence of the user recognition component 121/495. Precise determination of the confidence may depend on configuration and training of the confidence component 824 and the model(s) implemented thereby. The confidence component 824 may operate using a number of different machine learning models/techniques such as GMM, neural networks, etc. For example, the confidence component 824 may be a classifier configured to map a score output by the scoring component 822 to a confidence value.

The user recognition component 121/495 may output user recognition data 795 specific to a one or more user identifiers. For example, the user recognition component 121/495 may output user recognition data 795 with respect to each received feature vector 805. The user recognition data 795 may include numeric confidence values (e.g., 0.0-1.0, 0-1000, or whatever scale the system is configured to operate). Thus, the user recognition data 795 may output an n-best list of potential users with numeric confidence values (e.g., user identifier 123—0.2, user identifier 234—0.8). Alternatively or in addition, the user recognition data 795 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 121/495 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 795 may only include information related to the top scoring identifier as determined by the user recognition component 121/495. The user recognition component 121/495 may also output an overall confidence value that the individual confidence values are correct, where the overall confidence value indicates how confident the user recognition component 121/495 is in the output results. The confidence component 824 may determine the overall confidence value.

The confidence component 824 may determine differences between individual confidence values when determining the user recognition data 795. For example, if a difference between a first confidence value and a second confidence value is large, and the first confidence value is above a threshold confidence value, then the user recognition component 121/495 is able to recognize a first user (associated with the feature vector 805 associated with the first confidence value) as the user that spoke the user input with a higher confidence than if the difference between the confidence values were smaller.

The user recognition component 121/495 may perform thresholding to avoid incorrect user recognition data 795 being output. For example, the user recognition component 121/495 may compare a confidence value output by the confidence component 824 to a threshold confidence value. If the confidence value does not satisfy (e.g., does not meet or exceed) the threshold confidence value, the user recognition component 121/495 may not output user recognition data 795, or may only include in that data 795 an indicator that a user that spoke the user input could not be recognized. Further, the user recognition component 121/495 may not output user recognition data 795 until enough user recognition feature vector data 840 is accumulated and processed to verify a user above a threshold confidence value. Thus, the user recognition component 121/495 may wait until a sufficient threshold quantity of audio data of the user input has been processed before outputting user recognition data 795. The quantity of received audio data may also be considered by the confidence component 824.

The user recognition component 121/495 may be defaulted to output binned (e.g., low, medium, high) user recognition confidence values. However, such may be problematic in certain situations. For example, if the user recognition component 121/495 computes a single binned confidence value for multiple feature vectors 805, the system may not be able to determine which particular user originated the user input. In this situation, the user recognition component 121/495 may override its default setting and output numeric confidence values. This enables the system to determine a user, associated with the highest numeric confidence value, originated the user input.

The user recognition component 121/495 may use other data 809 to inform user recognition processing. A trained model(s) or other component of the user recognition component 121/495 may be trained to take other data 809 as an input feature when performing user recognition processing. Other data 809 may include a variety of data types depending on system configuration and may be made available from other sensors, devices, or storage. The other data 809 may include a time of day at which the audio data 411 was generated by the first device 110a or received from the first device 110a, a day of a week in which the audio data audio data 411 was generated by the first device 110a or received from the first device 110a, etc.

The other data 809 may include image data or video data. For example, facial recognition may be performed on image data or video data received from the first device 110a from which the audio data 411 was received (or another device). Facial recognition may be performed by the user recognition component 121/495. The output of facial recognition processing may be used by the user recognition component 121/495. That is, facial recognition output data may be used in conjunction with the comparison of the user recognition feature vector 840 and one or more feature vectors 805 to perform more accurate user recognition processing.

The other data 809 may include location data of the first device 110a. The location data may be specific to a building within which the first device 110a is located. For example, if the first device 110a is located in user A's bedroom, such location may increase a user recognition confidence value associated with user A and/or decrease a user recognition confidence value associated with user B.

The other data 809 may include data indicating a type of the first device 110a. Different types of devices may include, for example, a smart watch, a smart phone, a tablet, and a vehicle. The type of the first device 110a may be indicated in a profile associated with the first device 110a. For example, if the first device 110a from which the audio data 411 was received is a smart watch or vehicle belonging to a user A, the fact that the first device 110a belongs to user A may increase a user recognition confidence value associated with user A and/or decrease a user recognition confidence value associated with user B.

The other data 809 may include geographic coordinate data associated with the first device 110a. For example, a group profile associated with a vehicle may indicate multiple users (e.g., user A and user B). The vehicle may include a global positioning system (GPS) indicating latitude and longitude coordinates of the vehicle when the vehicle generated the audio data 411. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the first device 110a may indicate global coordinates and associated locations (e.g., work, home, etc.). One or more user profiles may also or alternatively indicate the global coordinates.

The other data 809 may include data representing activity of a particular user that may be useful in performing user recognition processing. For example, a user may have recently entered a code to disable a home security alarm. A first device 110a, represented in a group profile associated with the home, may have generated the audio data 411. The other data 809 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the first device 110a, this may be reflected in the other data 809 and considered by the user recognition component 121/495.

Depending on system configuration, the other data 809 may be configured to be included in the user recognition feature vector data 840 so that all the data relating to the user input to be processed by the scoring component 822 may be included in a single feature vector. Alternatively, the other data 809 may be reflected in one or more different data structures to be processed by the scoring component 822.

Figure 10:
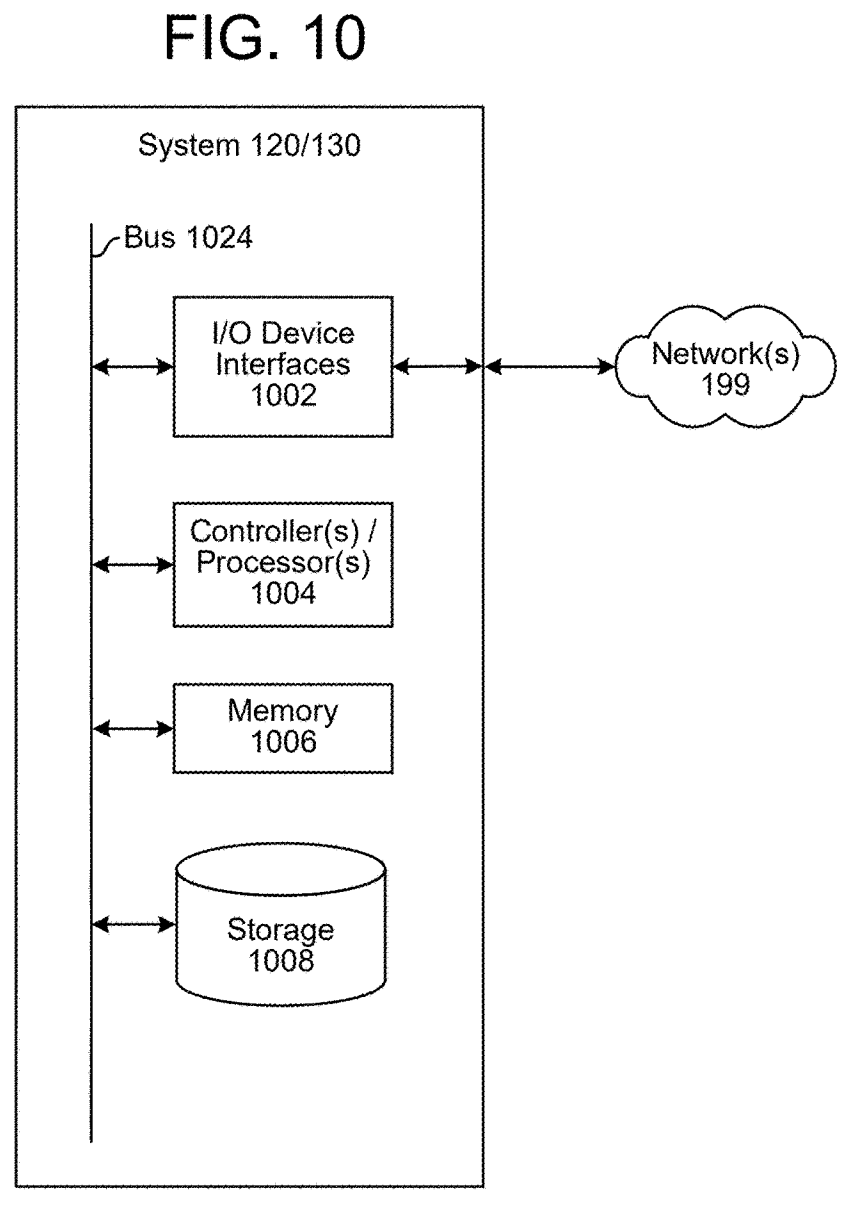

FIG. 9 is a block diagram conceptually illustrating a device 110 that may be used with the system 120 and/or the smart home system 130. FIG. 10 is a block diagram conceptually illustrating example components of a remote device, such as the system 120 and/or the smart home system 130, which may assist with ASR processing, NLU processing, etc.; and a skill component. The system 120 and/or the smart home system 130 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 and/or the smart home system 130 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the system 100 of the present disclosure, such as one or more systems 120 for performing ASR processing, one or more systems 120 for performing NLU processing, and one or more skill components, etc. In operation, each of these systems may include computer-readable and computer-executable instructions that reside on the respective system 120, as will be discussed further below.

Each of these devices (110/120/130) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/130) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/130) may also be connected to removable or external non-volatile memory and/or storage (such as a removable memory card, memory key drive, networked storage, etc.) through respective input/output device interfaces (902/1002).

Computer instructions for operating each device (110/120/130) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/130) includes input/output device interfaces (902/1002). A variety of components may be connected through the input/output device interfaces (902/1002), as will be discussed further below. Additionally, each device (110/120/130) may include an address/data bus (924/1024) for conveying data among components of the respective device. Each component within a device (110/120/130) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, the smart home system 130, and/or a skill component may include their own dedicated processors, memory, and/or storage. Alternatively, one or more of the components of the device 110, the system 120, the smart home system 130, and/or a skill component may utilize the I/O interfaces (902/1002), processor(s) (904/1004), memory (906/1006), and/or storage (908/1008) of the device(s) 110, system 120, the smart home system 130, or the skill component, respectively.

As noted above, multiple devices may be employed in a single system. In such a multi-device system, each of the devices may include different components for performing different aspects of the system's processing. The multiple devices may include overlapping components. The components of the device 110, the system 120, the smart home system 130, and a skill component, as described herein, are illustrative, and may be located as a stand-alone device or may be included, in whole or in part, as a component of a larger device or system.

Figure 11:
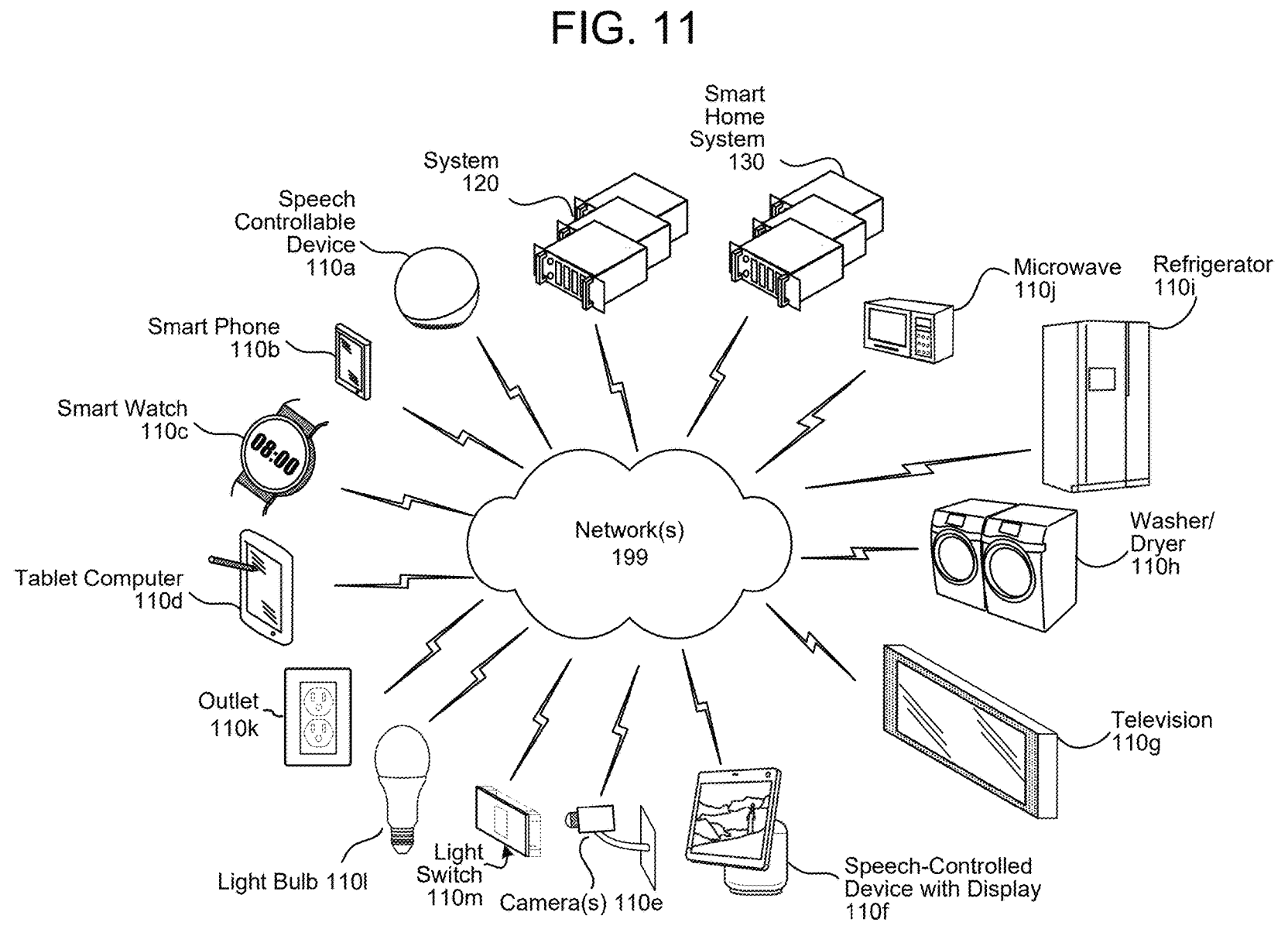

As illustrated in FIG. 11, multiple devices may contain components of the system 100 and the devices may be connected over a network(s) 199. The network(s) 199 may include a local or private network or may include a wide network such as the Internet. Devices may be connected to the network(s) 199 through either wired or wireless connections. For example, a speech controllable device 110*a*, a smart phone 110*b*, a smart watch 110*c*, a tablet computer 110*d*, a camera 110*e*, a speech-controlled device 110*f* with a display, a television 110*g*, a washer/dryer 110*h*, a refrigerator 110*i*, a microwave 110*j*, an outlet 110*k*, a light bulb 110*l*, and a light switch 110*m* may be connected to the network(s) 199 through a wireless service provider, over a Wi-Fi or cellular network connection, or the like. Other devices that may be connected to the network(s) 199 through either wired or wireless connections include a lock, a fan, a WIFI router, a thermostat, temperature sensor, a garage door, an alarm system, a motion sensor, a contact sensor, a smoke alarm, etc. Other devices are included as network-connected support devices, such as the system 120, the smart home system 130, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing system comprising:
   at least one processor; and
   at least one memory comprising instructions that, when executed by the at least one processor, cause the computing system to:
     determine activity representing at least:
       a first usage history indicating a first smart home device performed a first action in response to a first user input received by a first device, and
       a second of usage history indicating the first smart home device performed a second action in response to a second user input received by a second device;
     based on the activity data, determine a list of smart home devices that performed actions in response to user inputs received by the first device, instead of the second device;
     send, to the first device, the list of smart home devices;
     in response to receiving the list of smart home devices, determine, by the first device, user data representing characteristics of a user of the first device;
     using the user data, determine, by the first device and from the list of smart home devices, one or more smart home devices that performed one or more actions in response to user inputs of the user to the first device;
     after determining the one or more smart home devices that performed one or more actions in response to user inputs of the user to the first device, determine, by the first device, occurrence of a trigger event indicating the user is near or engaging with the first device; and
     in response to determining occurrence of the trigger event, display, by the first device, a representation of at least one of the one or more smart home devices.

2. The computing system of claim 1, wherein the at least one memory further comprises instructions that, when executed by the at least one processor, further cause the computing system to, by the first device:
   determine image data using at least one camera of the first device;
   process the image data to determine a portion of the image data corresponding to a face;
   process the portion of the image data corresponding to the face to determine first facial feature embedding data representing facial features of the face;
   determine the user data to be stored facial feature embedding data corresponding to the first facial feature embedding data;
   determine usage history data associated with the user data; and determine the one or more smart home devices that performed one or more actions in response to user inputs of the user to the first device using the list of smart home devices and the usage history data.

3. The computing system of claim 1, wherein the at least one memory further comprises instructions that, when executed by the at least one processor, further cause the computing system to, by the first device:

using the user data, determine the user corresponds to a first user type; and based on determining the user corresponds to the first user type, determine the one or more smart home devices that performed one or more actions in response to user inputs of the user to the first device to omit a third smart home device represented in the list of smart home devices, wherein the third smart home device corresponds to a smart home device type inappropriate to be controlled by a user of the first user type.

4. The computing system of claim 1, wherein the trigger event corresponds to one or more of:

determining image data includes a representation of a face;

determining audio data includes speech directed to the first device;

determining the user has navigated to a graphical user interface screen of the first device;

determining a period of time has elapsed;

detecting motion of an object within a vicinity of the first device;

detecting a wireless signal emitted from a third device;

detecting a service set identifier of a wearable device;

detecting a palm the user;

receiving second data representing a height of the user;

receiving third data representing a gait of the user;

receiving fourth data representing at least one of a hair color and a hair length; and receiving fifth data indicating a fourth device has detected the user.

5. A computing device comprising:

at least one processor; and at least one memory comprising instructions that, when executed by the at least one processor, cause the computing device to:

receive a list of content generated based on activity data associated with the computing device;

determine user data representing characteristics of a user of the computing device;

using the user data, determine, from the list of content, one or more instances of content that was generated or output in response to user inputs of the user to the computing device;

after determining the one or more instances of content that was generated or output in response to user inputs of the user to the computing device, determine occurrence of a trigger event indicating the user is near or engaging with the computing device; and in response to determining occurrence of the trigger event, present an output requesting an input requesting performance of an action corresponding to at least one of the one or more instances of content that was generated or output in response to user inputs of the user to the computing device.

6. The computing device of claim 5, wherein the at least one memory further comprises instructions that, when executed by the at least one processor, further cause the computing device to:

determine usage history data associated with the user data; and determine the one or more instances of content that was generated or output in response to user inputs of the user to the computing device using the list of content and the usage history data.

7. The computing device of claim 6, wherein the at least one memory further comprises instructions that, when executed by the at least one processor, further cause the computing device to:

receive image data using at least one camera of the computing device;

perform facial detection processing on the image data to determine a portion of the image data corresponds to a face;

process the portion of the image data corresponding to the face to determine first facial feature embedding data representing facial features of the face;

determine stored facial feature embedding data corresponding to the first facial feature embedding data; and determine the usage history data to be associated with the stored facial feature embedding data.

8. The computing device of claim 6, wherein the at least one memory further comprises instructions that, when executed by the at least one processor, further cause the computing device to:

receive audio data corresponding to a spoken user input;

process the audio data to determine first speech characteristic embedding data representing speech characteristics of the spoken user input;

determine stored speech characteristic embedding data corresponding to the first speech characteristic embedding data; and determine the usage history data to be associated with the stored speech characteristic embedding data.

9. The computing device of claim 5, wherein the at least one memory further comprises instructions that, when executed by the at least one processor, further cause the computing device to:

based on the user data, determine the user corresponds to a first user type; and determine the one or more instances of content that was generated or output in response to user inputs of the user to the computing device further based on determining the user corresponds to the first user type.

10. The computing device of claim 5, wherein the list of content comprises a device name corresponding to a smart home device that is controllable using the computing device.

11. The computing device of claim 5, wherein the list of content comprises an identifier corresponding to a group of actions capable of being performed in response to a single user input.

12. The computing device of claim 5, wherein the at least one memory further comprises instructions that, when executed by the at least one processor, further cause the computing device to:

receive input data corresponding to a user input, the user input corresponding to the input requesting performance of an action corresponding to at least one of the one or more instances of content that was generated or output in response to user inputs of the user to the computing device; and commence performance of skill processing in response to the input data.

13. The computing device of claim 5, wherein the at least one memory further comprises instructions that, when executed by the at least one processor, further cause the computing device to:

determine a period of time has elapsed since commencing display of first content based on past content that was generated or output in response to user inputs of the user to the computing device; and based on determining the period of time has elapsed, determine the one or more instances of content that was generated or output in response to user inputs of the user to the computing device and present the output request the input requesting performance of an action corresponding to at least one of the one or more instances of content that was generated or output in response to user inputs of the user to the computing device.

14. The computing device of claim 5, wherein:

The computing device corresponds to a first computing device;

the activity data represents at least:

a first usage history indicating first content was generated or output in response to a first user input received by the computing device, and a second usage history indicating second content was generated or output in response to a second user input received by a second computing device; and the list of content represents content that was generated or output in response to user inputs received by the first computing device, instead of the second computing device.

15. A computer-implemented method performed by a computing device, the computer-implemented method comprising:

receiving a list of content generated based on activity data associated with the computing device;

determining user data representing characteristics of a user of the computing device;

using the user data, determining from the list of content, one or more instances of content that was generated or output in response to user inputs of the user to the computing device;

after determining the one or more instances of content that was generated or output in response to user inputs of the user to the computing device, determining occurrence of a trigger event indicating the user is near or engaging with the computing device; and in response to determining occurrence of the trigger event, presenting an output requesting an input requesting performance of an action corresponding to at least one of the one or more instances of content.

16. The computer-implemented method of claim 15, further comprising:

determining usage history data associated with the user data; and determining the one or more instances of content that was generated or output in response to user inputs of the user to the computing device using the list of content and the usage history data.

17. The computer-implemented method of claim 16, further comprising:

receiving image data using at least one camera of the computing device;

performing facial detection processing on the image data to determine a portion of the image data corresponds to a face;

processing the portion of the image data corresponding to the face to determine first facial feature embedding data representing facial features of the face;

determining stored facial feature embedding data corresponding to the first facial feature embedding data; and determining the usage history data to be associated with the stored facial feature embedding data.

18. The computer-implemented method of claim 16, further comprising:

receiving audio data corresponding to a spoken user input;

processing the audio data to determine first speech characteristic embedding data representing speech characteristics of the spoken user input;

determining stored speech characteristic embedding data corresponding to the first speech characteristic embedding data; and determining the usage history data to be associated with the stored speech characteristic embedding data.

19. The computer-implemented method of claim 15, further comprising:

based on the user data, determining the user corresponds to a first user type; and determining the one or more instances of content that was generated or output in response to user inputs of the user to the computing device further based on determining the user corresponds to the first user type.

20. The computer-implemented method of claim 15, wherein the list of content comprises at least one of:

a device name corresponding to a smart home device that is controllable using the computing device; or an identifier corresponding to a group of actions capable of being performed in response to a single user input.

21. The computer-implemented method of claim 15, further comprising:

receiving input data corresponding to a user input, the user input corresponding to the input requesting performance of an action corresponding to at least one of the one or more instances of content that was generated or output in response to user inputs of the user to the computing device; and commencing performance of skill processing in response to the input data.

22. The computer-implemented method of claim 15, further comprising:

determining a period of time has elapsed since commencing display of first content based on past content that was generated or output in response to user inputs of the user to the computing device; and based on determining the period of time has elapsed, determining the one or more instances of content that was generated or output in response to user inputs of the user to the computing device and presenting the output requesting the input requesting performance of an action corresponding to at least one of the one or more instances of content that was generated or output in response to user inputs of the user to the computing device.

* * * * *